United States Patent [19]

Alexander et al.

[11] Patent Number: 5,467,459
[45] Date of Patent: Nov. 14, 1995

[54] IMAGING AND GRAPHICS PROCESSING SYSTEM

[75] Inventors: Thomas Alexander; Yongmin Kim; Hyunwook Park; Kil-Su Eo; Jing-Ming Jong, all of Seattle, Wash.

[73] Assignees: Board of Regents of the University of Washington, Seattle, Wash.; Samsung Electronics, Rep. of Korea

[21] Appl. No.: 101,366

[22] Filed: Aug. 2, 1993

Related U.S. Application Data

[63] Continuation of Ser. No. 744,587, Aug. 13, 1991, abandoned.

[51] Int. Cl.[6] .............................. G06F 12/04; G06F 13/00
[52] U.S. Cl. .................... 395/480; 395/497.04; 395/412; 364/DIG. 1; 364/246.3; 364/255.8; 364/940.3; 364/DIG. 2; 364/966.4
[58] Field of Search .................................. 395/425, 400; 364/200 MS, 900 MS

[56] References Cited

U.S. PATENT DOCUMENTS

| | | | |
|---|---|---|---|
| 4,300,192 | 11/1981 | Couleur et al. | 395/425 |
| 4,484,265 | 11/1984 | Czekalski | 395/400 |
| 4,730,251 | 3/1988 | Aakre et al. | 395/325 |
| 4,819,152 | 4/1989 | Deerfield et al. | 364/200 |
| 4,885,699 | 12/1989 | Taoda et al. | 364/518 |
| 4,914,577 | 4/1990 | Stewart et al. | 395/400 |
| 4,920,504 | 4/1990 | Sawada et al. | 364/521 |
| 5,008,852 | 4/1991 | Mizoguchi | 364/900 |
| 5,047,958 | 9/1991 | Comins et al. | 364/521 |
| 5,161,247 | 11/1992 | Murakami et al. | 395/800 |

OTHER PUBLICATIONS

Tom Diede et al., "The Titan Graphics Supercomputer Architecture," *IEEE Computer,* Sep. 1988, pp. 13–30.
Akira Fujimoto, "A 3–D Graphics Display System With Depth Buffer and Pipeline Processor," *IEEE Computer Graphics and Applications,* Jun. 1984, pp. 49–61.

Primary Examiner—Reba I. Elmore
Assistant Examiner—Frank J. Asta
Attorney, Agent, or Firm—Chrstensen, O'Connor, Johnson & Kindness

[57] ABSTRACT

The present invention provides a unified image and graphics processing system that provides both image and graphics processing at high speeds. The system includes a parallel vector processing unit, a graphics subsystem, a shared memory and a set of high-speed data buses for connecting all of the other components. Generally, the parallel vector processing unit includes a series of vector processors. Each processor includes a vector address generator for efficient generation of memory addresses for regular address sequences. In order to synchronize and control the vector processors' accesses to shared memory, the parallel vector processing unit includes shared memory access logic. The logic is incorporated into each vector processor. The graphics subsystem includes a series of polygon processors in a pipelined configuration. Each processor is connected in the pipeline by a first-in-first-out (FIFO) buffer for passing data results. Additionally, each polygon processor is connected to a local shared memory in which program instructions and data are stored. The graphics subsystem also includes a device addressing mechanism for identifying a destination device using a tagged address. The shared memory, the parallel vector processor and the graphics subsystem also incorporate an abbreviated addressing scheme, which reduces the amount of information required to request sequential addresses from the shared memory.

2 Claims, 14 Drawing Sheets

IMAGING AND GRAPHICS PROCESSING SYSTEM

This is a continuation application of the prior application Ser. No. 07/744,587, filed on Aug. 13, 1991, of Yongroin Kim, Thomas Alexander, Hyunwook Park, Kil-Su Eo, and Jing-Ming Jong for IMAGING AND GRAPHICS PROCESSING SYSTEM the benefit of the filing date of which are hereby claimed under 35 U.S.C. §120.

TECHNICAL AREA OF THE INVENTION

The present invention is a system for imaging and graphics processing, in particular, it is a workstation that provides relative parity in imaging and graphics processing speeds.

BACKGROUND OF THE INVENTION

Imaging, or image processing, includes image enhancement, restoration, reconstruction, compression and decompression, i.e., any process that generates a new image from an original image. Computer graphics, on the other hand, generates images from a data base of objects such as polygons and lines.

Traditionally, imaging and graphics systems have developed separately because of the distinct processing requirements in each area. Application areas requiring both imaging and graphics capabilities are gradually increasing. In view of the proliferation of the use of imaging and graphics, special computer architectures optimized to either imaging or graphics are being developed. Although many workstations combine imaging and graphics processing capabilities, it is uncommon for a workstation to be capable of both types of processing at high speeds. Thus, users are generally required to utilize two separate systems, each excelling in one area, or to utilize a combined system that provides high speed processing in one area and lower speed capabilities in the other area.

As noted, several kinds of special-purpose workstations have been designed and commercialized for either imaging or graphics processing. Among them, the Ardent Titan Graphics Supercomputer, the Silicon Graphics Superworkstation, and the AT&T Pixel Machine provide high polygon throughput by using dedicated graphics hardware. However, these systems do not provide high imaging performance. On the other hand, the Goodyear Massively Parallel Processor (MPP), the Connection Machine, and the Carnegie Mellon University Warp can achieve high image computing rates, but not high graphics performance.

Multiprocessor systems are becoming standard architectures for these types of workstations. A multiprocessor system is a system that includes a set of interconnected processors, which include associated local memory and input/output components. System communication and synchronization are performed by the exchange of messages between the processors. A simple example of a multiprocessor system is a set of serially connected processors, each of which is programmed to perform a unique function. This configuration is referred to as a pipelined architecture. During operation of this type of system, information or data are input to the first processor, which performs its particular function and passes the output data to the next connected processor. The cascading of output data continues until the final output or result is generated by the last processor. Pipelined architectures are efficient when a sequential set of program tasks are being performed. By assigning the tasks to the processors so that the processors' sequence corresponds to the task sequence, the tasks are carried out very efficiently by processors that are dedicated to perform the particular tasks.

A parallel architecture multiprocessing configuration includes a series of processors that are programmed to perform the same task in a synchronous manner. Generally, each processor is programmed with the same task instructions and is provided with a unique set of data; the sets of data are generally portions of a complete data set, such as an image. Each processor then processes its data and returns the results to a main memory location. The processors may be user programmable or may be dedicated to a particular task. In this manner, a large set of data can be quickly processed.

Because multiprocessor systems are meant to process large quantities of data, fast data addressing and transfer along with efficient processor operation are of key importance. It is often the case that a system's processing power is not fully utilized because data cannot be accessed at the same rate that the processor can function. An architecture for an imaging and graphics processing workstation must not only incorporate acceptable processing capabilities for both types of systems, but must also provide means for fast and efficient data addressing and transfer between the two systems and, possibly, a host system.

The present system is configured with a parallel architecture for imaging and a pipelined architecture for graphics processing interconnected by a high-speed data bus to a high bandwidth central shared memory. A set of multiprocessor control capabilities, coupled with efficient data access schemes, allows the system to achieve high performance in both imaging and graphics processing.

SUMMARY OF THE INVENTION

The present invention provides a unified image and graphics processing system that provides both image and graphics processing at high speeds. The system includes a parallel vector processing unit, a graphics subsystem, a shared memory and a set of high-speed data buses for connecting all of the other components. All host communications are performed through the graphics subsystem. Generally, the parallel vector processing unit includes a series of vector processors. Each processor includes a vector address generator for efficient generation of memory addresses for regular address sequences. In order to synchronize and control the vector processors' accesses to shared memory, the parallel vector processing unit includes shared memory access logic. The logic is incorporated into each vector processor.

The graphics subsystem includes a series of polygon processors in a pipelined configuration. Each processor is connected in the pipeline by a first-in-first-out (FIFO) buffer for passing data results. Additionally, each polygon processor is connected to a local shared memory in which program instructions and data are stored. The combination of the pipelined FIFO connections and the local shared memory reduce the sequential processing requirements for the pipeline. The graphics subsystem also includes a device addressing mechanism incorporated in the polygon processors and a display unit. Because the display unit includes a number of devices to which graphics data is destined, the device addressing mechanism utilizes tagged data to identify the particular device to which data is to be sent. The tagging scheme eliminates the need to increase the data bandwidth between the polygon processors and the display unit.

The shared memory, the parallel vector processor and the graphics subsystem incorporate an abbreviated addressing scheme, which reduces the amount of information required to request sequential addresses from the shared memory. The combination of each of these multiprocessor control and address generation schemes produces an imaging and graphics processing system that provides both high-speed imaging and graphics processing in a single environment.

In accordance with the present invention, an address sequence generation method and system for generating such sequences are provided. The method generates one or more zero-dimensional address codes that are used by memory access components to retrieve the addressed data. The method includes the step of generating a one-dimensional address code, which includes a base value and a sequence width value. A set of zero-dimensional addresses are then generated from the one-dimensional address code. The set of zero-dimensional addresses correspond to sequential addresses beginning from the base value. The set is generated by incrementing the base value by a constant factor until the number of zero-dimensional addresses in the set is equal to the sequence width value. In an alternative embodiment, a width skip value is included in the one-dimensional address code and that value is used as the constant factor.

The method for generating an address sequence alternatively includes the additional step of generating a two-dimensional address code. The two-dimensional address code includes the base value, the sequence width value, and a sequence height value. To generate a set of one-dimensional address codes from the two-dimensional address code, a set of base values is generated, which includes the base value and includes a number of base values equal to the sequence height value. The set of base values is generated by incrementing the initial base value by the memory width value and multiplying the result by a constant factor. A set of one-dimensional address codes is formed using each of the base values from the set in combination with the sequence width value. Each one-dimensional address code is then used to generate a set of zero-dimensional addresses.

In accordance with other aspects of the present invention, a method for addressing data cached in an addressable cache memory is provided. The method is a combination of fully associative and direct-mapped caching. Preferably, the management of the fully associative caching is performed in accordance with software controls and the management of the direct-mapped caching is performed by hardware components.

The data caching method is integrated into the parallel vector processing unit. The method is incorporated into a system wherein data is stored in the cache memory, which is partitioned into distinct regions. Each of the regions is associated with a region register and is further partitioned into a set of lines. In turn, each of the lines is associated with a line register. Memory addresses include a region tag and a word tag, and each of the word tags includes a line tag and a line index. For a given data address, the method includes the steps of comparing a region tag from the address to the contents of each of the region registers. If the region tag matches the content of one of the region registers, then comparing a line tag from the address with the contents of a line register for the matched region. The particular line register is identified by a line index from the address. Finally, if the line tag matches the contents of the line register, then identifying the contents of the line register as the addressed data.

The data caching method also includes the steps of monitoring the comparison of region tags with region registers, and, if the region tag does not match the contents of a region register, then obtaining the addressed data from a main memory. The address is then added to the caching system by selecting a region register, loading a region tag from the address into the selected region register, and loading a line tag from the address into a line register for the selected region. The line register is identified by a line index from the address. In this manner, a region is overwritten by the new data address information. Preferably, this region management is carried out by software controls.

The data caching method also includes the steps of obtaining the addressed data from a main memory if the line tag does not match the content of the line register. If no match occurs, the addressed data is obtained from the main memory, and loaded into the data cache. A line tag from the data address is then loaded into a line register; the line register is identified by a line index from the address. In a preferred embodiment, the line tag management is performed by data caching hardware.

In accordance with other aspects of the present invention, the graphic subsystem includes a pipelined polygon processing system that utilizes a shared local memory for storage of program instructions and data, and interprocessor connection via first-in-first-out buffers for fast data passing between the polygon processors. The pipelined polygon processing system is particularly useful for processing a set of sequential subtasks that are assigned to corresponding sequentially connected polygon processors. The pipelined system includes a local shared memory, a set of sequentially connected polygon processors and a controller. Each of the polygon processors is connected to the local shared memory. Each processor is also related to a buffer for receiving data to be processed. The buffers also serve as the communication element between the polygon processors. Thus, with the exception of the first processor in the series, each processor is connected to a preceding processor by the buffer for receiving processed data from the preceding processor. The controller assigns each subtask to one of the polygon processors, and each of the processors fetches the corresponding subtask instructions from the local shared memory. A set of data, such as polygon or line data, is sent to the first processor by the controller. As each subtask is carried out by one of the connected processors, the data processing results are transmitted through the pipeline sequentially through the buffers. Using the local shared memory and the buffer interconnections, the pipelined processors provide efficient polygon processing with reduced memory accesses.

In the pipelined processing system, a task that is comprised of subtasks, each of which is associated with a processing requirement that may increase in a known fashion based on characteristics of a set of data, is allocated between the polygon processors by the controller. The controller determines, for a set of data, the processing requirements of each subtask based on the data characteristics. A total processing requirement is calculated. The controller then assigns the subtasks to the sequentially connected processors so that the total processing requirement is approximately balanced among the processors.

In accordance with still further aspects of the present invention, the parallel vector processing unit includes a shared device access system, for controlling access to shared variables in the shared memory. The access system includes a clock for generating token passing signals, a token register associated with each processing unit into which a token is loaded, token communication logic for connecting the token registers in a continuous ring configuration to allow passing of the tokens in a unidirectional manner between connected register pairs, and token logic unit associated with each processor. The tokens that are loaded into the token registers include one access token and a set of null tokens. The token logic units include a timing unit connected to the clock for receiving clock signals upon which tokens are passed between the connected token registers. The logic unit for a particular processor also includes access controls for determining when a processing unit requires access to the shared device and, if such access is required, determining when the token register is loaded with the access token, loading the token register with a null token, and indicating to the processor that shared device access is available. In this manner, only the processor that has the access token in its token register is able to access the shared device.

In accordance with still further aspects of the present invention, the parallel vector processing unit includes a vector address sequence generator for generating a sequence of addresses in accordance with a known pattern. These patterns are patterns that often occur in image processing address requests. The sequence generator includes an adder, a base address register, an increment table, and a controller. The adder receives and combines inputs from the base address register and the increment table. The base address register is connected to the adder to transmit as input the contents of the base address register and to receive as a new value for the base address register the results from the adder. The increment table includes subpattern entries, each including an increment field and a next-entry field. The increment table is connected to the adder so as to transmit as input to the adder the content of an increment field for a current subpattern entry. Finally, the controller initially loads a base address into the base address register and loads the increment table with values for a particular pattern. During operation, the controller causes the base address register to receive the results from the adder, selects a new current subpattern entry from the subpattern entries based on the next-entry value in the current subpattern entry, and repeating the operation steps until the pattern is completed. The result from the adder is a sequence represented by the increment table entries and the base address.

The increment table subpattern entries may also include a count field for identifying the number of times an increment should be repeated within the subpattern corresponding to the table entry. The controller selects the current subpattern entry as the new subpattern entry, i.e., repeats the increment output, a number of times equal to the count value in the current subpattern entry. The increment table subpattern entries may also include a condition field. The condition field identifies a condition code that describes the selection of the next-entry based on the condition related to the condition code, the count value, and the next-entry value.

The present invention also provides a method for determining increment table values for address sequences.

In accordance with additional aspects of the present invention, a method of generating a device identification from a data memory address is incorporated into the parallel vector processing unit and the pipelined polygon processors. The method includes the step of partitioning an addressable memory space into a plurality of sectors, so that the sectors are uniquely identifiable by a tag portion of an address identifying the sectors. Each of these sectors is related to a device. A processor related to the partitioned memory generates a data address at which transmitted data is stored. A tag portion from the data address is extracted and concatenated it to transmitted data to form tagged data. The tagged data is then transmitted to an device identifier, which extracts the tag portion from the tagged data, identifying a device from the tag portion, and extracts the transmitted data from the tagged data and transmits the retrieved data to the identified device.

It is expected that the discipline of imaging and graphics will merge even more closely as computer workstation technologies advance. For example, advanced medical applications require high speed image processing such as adaptive histogram equalization for contrast enhancement, rotation, zoom, window and level, image compression and decompression, cine display, edge enhancement and detection, and image analysis, together with compute-intensive graphics operations such as 3-Dimensional reconstruction and volume rendering. Also, military applications need advanced image processing and analysis as well as graphics operations such as vector map handling and terrain modeling. As a final example, the rapidly growing field of scientific visualization simultaneously demands very high floating-point performance and real-time graphics rendering.

BRIEF DESCRIPTION OF THE DRAWINGS

The foregoing abstracts and the attendant advantages of this invention will become more readily appreciated and the same become better understood by reference to the following detailed description, when taken in conjunction with the accompanying drawings, wherein.

DETAILED DESCRIPTION OF THE PREFERRED EMBODIMENTS

Figure 1:
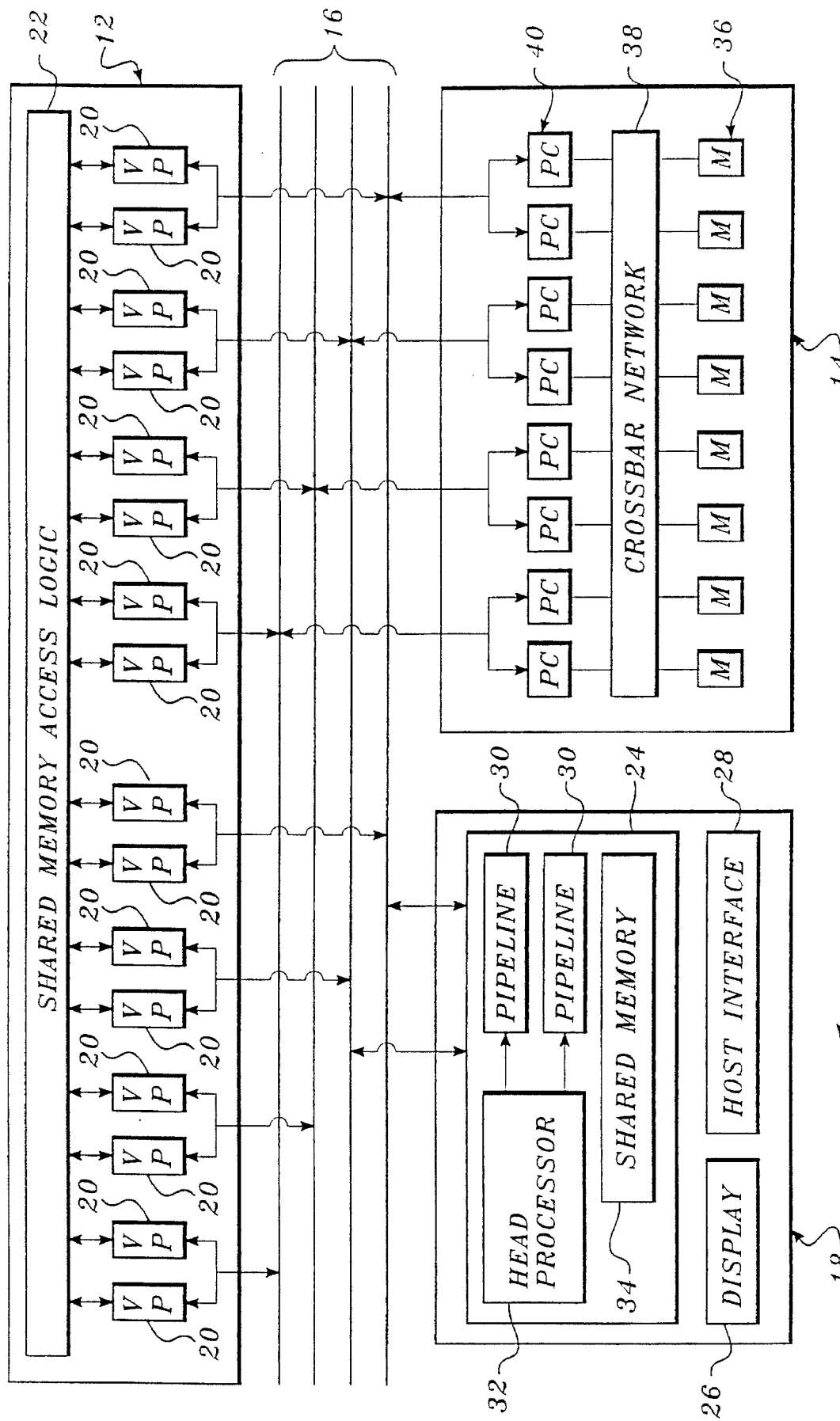
FIG. 1 is a block diagram of an imaging and graphics processing system in accordance with the present invention.

With reference to FIG. 1, an imaging and graphics processing system 10 in accordance with the present invention consists of a parallel vector processor 12 for image processing, a shared memory 14, a set of high speed buses 16, and a graphics subsystem 18. Each of these units incorporates addressing schemes and/or multiprocessor control schemes that support the high speed imaging and graphics processing of the imaging and graphics processing system 10.

Parallel Vector Processing Unit

The parallel vector processing unit comprises a number of vector processors connected in parallel to the buses 16. In one actual embodiment, the parallel vector processing unit includes sixteen vector processors 20 that provide a peak of 1,280 million floating point operations per second (MFLOPS) of computing power.

This configuration allows image processing operations, such as image transforms and convolution, to be computed by the vector processors at very high speeds. Each of the sixteen vector processors can operate independently or in synchronism with the others. The vector processors 20 perform operations with data that are generally stored in the shared memory 14. Since sixteen vector processors 20 are connected to the shared memory 14 via the four high speed buses 16, each high speed bus provides four vector processors with a communication path to the shared memory. In order to generate address sequences for imaging operations without software overhead, each vector processor 20 includes a programmable address generator (not shown). The parallel vector processor 12 also includes shared memory access logic 22. This logic permits only one vector processor at a time to access certain protected areas of the shared memory to maintain the integrity of the stored data.

The graphics subsystem 18 includes a graphics engine 24, a display component 26 and a host interface component 28. The graphics engine 24 is configured for pipeline processing using two polygon processing pipelines 30 for carrying out the actual computations, and a head processor 32 for control and coordination. To avoid having to provide separate local processing memory for each processor in the processing pipelines, the processing pipelines utilize a small local shared memory 34 for most data and program storage. Additionally, the graphics engine 24 incorporates a device identification scheme for transmitting graphics data from the pipelines to one of a set of pixel processing devices (not shown) in the display component 26.

All communications between the major processing units, e.g., the vector processing unit 12 and the graphics subsystem 18, are performed through the shared memory 14. In one actual embodiment, the shared memory uses a 32-way interleaving scheme in order to achieve a 1,280 Mbytes/sec memory access bandwidth with standard Dynamic Random Access Memories (DRAMs) 36. Such schemes are known in the art. The interconnection network between the processing units and the shared memory includes a crossbar network 38 connected to the four high speed buses 16 via port controllers 40. The shared memory and the interconnection network are essential for the realization of high computing performance, since many of the limitations in parallel computing systems arise from insufficient data transfer bandwidth.

In one actual embodiment, each high speed bus 16 runs at a speed of 80 MHz, and provides a 32-bit path for address and data, together with some control signals. The sustained data transfer rate of all four high speed buses is 1,280 Mbytes/sec, which is matched to the memory bandwidth of the shared memory. In this manner, the data transfer bandwidth is maximized relative to the shared memory capability. The vector processing unit 12, the graphics subsystem 18, and shared memory 14 utilize an abbreviated addressing scheme to reduce the amount of information required to request data from the shared memory. This scheme reduces the addressing bandwidth required on the high speed buses. The addressing scheme is particularly useful for moving blocks of image data during graphics processing.

These various memory access and multiprocessor control schemes result in an overall system with imaging and graphics processing capabilities that are well balanced and that yield high sustained performance. Details of the system architecture and operation are provided herein.

Figure 2:
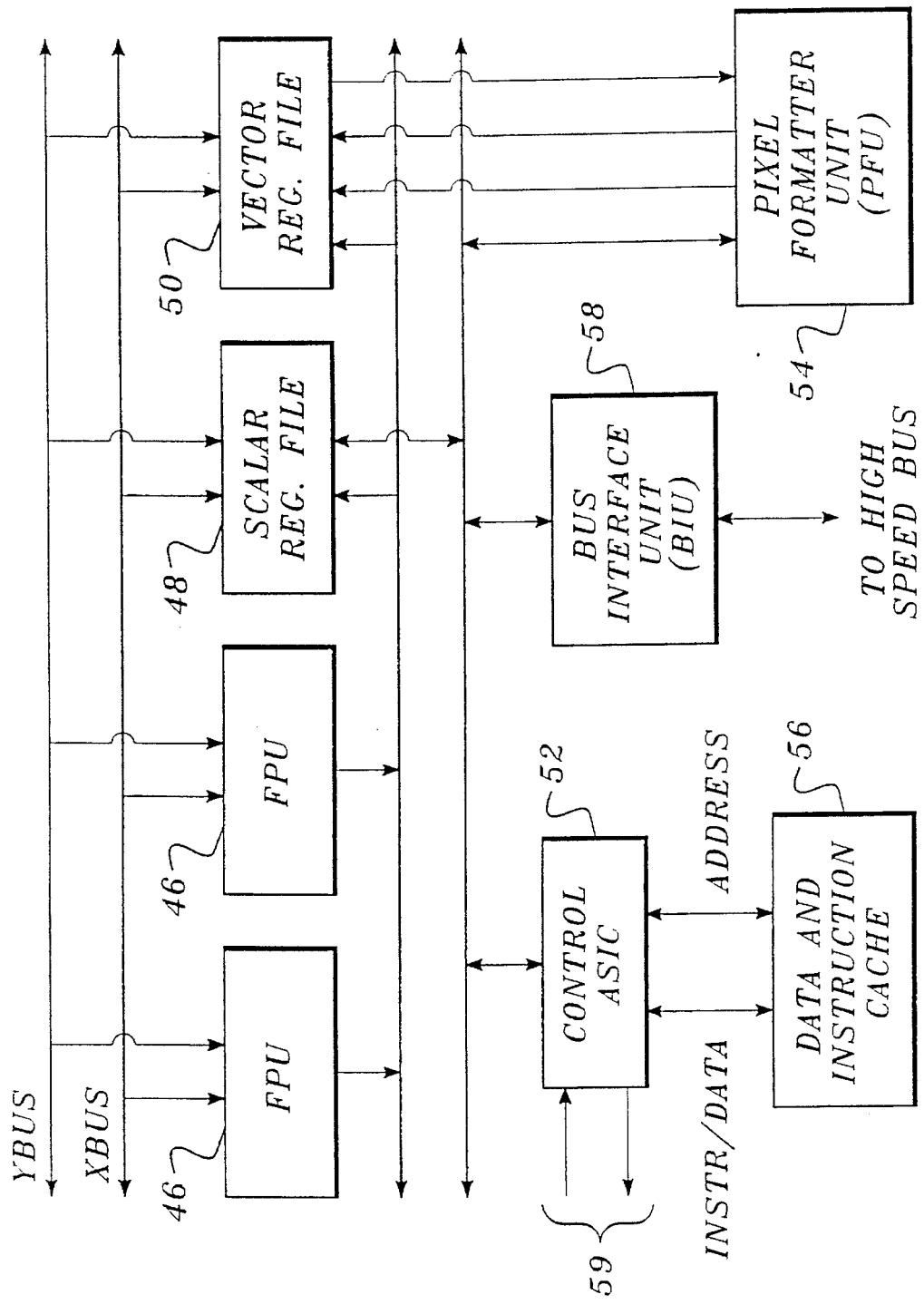
FIG. 2 is a schematic diagram of a vector processor in accordance with the present invention.

The parallel vector processing unit 12 is the primary computation engine in the system, and is used mainly for imaging and general mathematical computations. With reference to FIG. 2, a single vector processor 20 comprises two floating point units (FPUs) 46, a set of scalar register files 48 and vector register files 50, a control ASIC 52 for control and instruction issuance, a pixel formatter unit (PFU) 54 for pixel handling, an instruction and data cache 56, and a bus interface unit (BIU) 58 for interface to the high speed buses 16.

Four vector processors 20 are connected to a single high speed bus, in two pairs, as shown in FIG. 1. Each pair of vector processors shares the high speed bus, preferably in an alternating fashion. The bus interface unit 58 provides the signal conversion between the standard Transistor-Transistor Logic (TTL) level interface to the vector processors 20 and the Backplane-Transceiver Logic (BTL) level interface to the high speed buses. Each BIU includes a bus arbiter (not shown) that controls the arbitration between the vector processor pairs, which communicate on the same bus phase.

The two floating point units 46, implemented using 74ACT8847 CMOS floating point processor chips from Texas Instruments, of Dallas, Tex., operate in an alternating fashion. Each floating point unit possesses a full set of arithmetic and logic instructions, and can handle single- and double-precision floating point operands as well as 32-bit integer data values. The arithmetic logic unit (ALU) and the multiplier within the floating point processor can operate independently or be used simultaneously when performing pipelined multiply-accumulates. The peak performance of a single floating point processor is 40 MFLOPS, so that one vector processor provides a peak computing rate of 80 MFLOPS.

Control of the vector processor 20, including instruction fetch/issue and data cache handling, is the domain of the control ASIC 52. The control ASIC 52 fetches and interprets instructions from the shared memory 14, and controls the floating point units 46 so as to execute the desired arithmetic and logical operations. The control ASIC also controls the interprocessor communications via the shared memory access logic 22 and performs all the control and sequencing necessary for proper operation of the vector processor 20. The control ASIC is implemented in one actual embodiment using a 30,000 gate 1 micron CMOS standard-cell custom integrated circuit.

The scalar register files 48 and vector register files 50 facilitate the fast execution of both scalar (bookkeeping) calculations and vector instructions. During scalar execution, the control ASIC 52 manipulates the four scalar buses to move data to and from the two floating point units 46, the instruction and data cache 56 and the scalar register files 48. In addition, a set of three 2048-word vector register files 50 are also provided for each vector processor 20. Each vector register file has a separate read and write port. During vector operations, the control ASIC 52 loads two of the vector register files 50 with arrays of input operands from shared memory via bus interface unit 58, and then causes the floating point units 46 to perform the desired computations on the arrays to generate a third array, which is stored into the third vector register file 50, and subsequently transmitted back to the shared memory 14 for storage, again via bus interface unit 58.

In the present system, data conversion between floating point and integer values, referred to as pixel formatting, is carried out by a special pixel formatter unit (PFU) 54. The unit is implemented with a field programmable gate array. In general, image pixel data include 8-bit or 16-bit packed unsigned integer values, whereas image processing is performed in floating point for accuracy. Also, computation results, which are in floating point, are preferably converted to 8-bit or 16-bit packed integer values before transfer to the shared memory. The pixel formatter unit carries out this function for the vector processor 20. The conversion rate of the pixel formatter unit is 40 million pixels per second, i.e., one pixel integer value can be converted to a 32-bit floating-point value in a 25 nsec cycle time and vice versa. The image pixel value can be a 1, 4, 8, or 16-bit unsigned integer, any of which can be handled by the pixel formatter unit. The pixel formatter unit also transfers data stored in the third vector register file 50 to the other vector register files so that the computational results can be used as source operands if necessary.

The instruction and data cache 56 is used as local memory for the control ASIC 52. In one actual embodiment, the instruction and data cache includes two sets of 4k by 32-bits memory for instructions and data. To provide for more efficient access to particular regions of the instruction and data cache 56, the control ASIC 52 implements a data caching scheme in accordance with the present invention. Generally, data caches are used to locally store blocks of data that have been retrieved from a main memory, such as the shared memory 14. Accesses to the shared memory are costly, with respect to time required to request and receive the data, while accesses to the data cache are very rapid. Thus, in applications in which blocks of data may be required, when a shared memory access occurs, rather than simply retrieving one word of data, a series of data blocks following that word will be retrieved and stored in the data cache. Main memory accesses are then reduced if the application subsequently references the cached data.

Given a data cache, it is also important to efficiently determine whether data from a particular memory address are currently stored in the cache or whether they must be fetched from the shared memory. The present invention combines two methods of addressing for quick and efficient access to the data cache and data cache management. The scheme combines fully associative and direct-mapped addressing methods for data caching. Both of these schemes are well known in the art of data caching. In addition, the present invention utilizes a combination of software and hardware data cache management techniques to ensure that a cache update that occur when a cache miss is experienced is productive from the standpoint of maintaining heavily used data in the cache and overwriting lesser used data when necessary. Software implemented within the control ASIC 52 performs this latter function for the fully associative aspect of the caching architecture, while a control state machine (not shown) performs the update function for the direct-mapped portion of the caching scheme.

Figure 3:
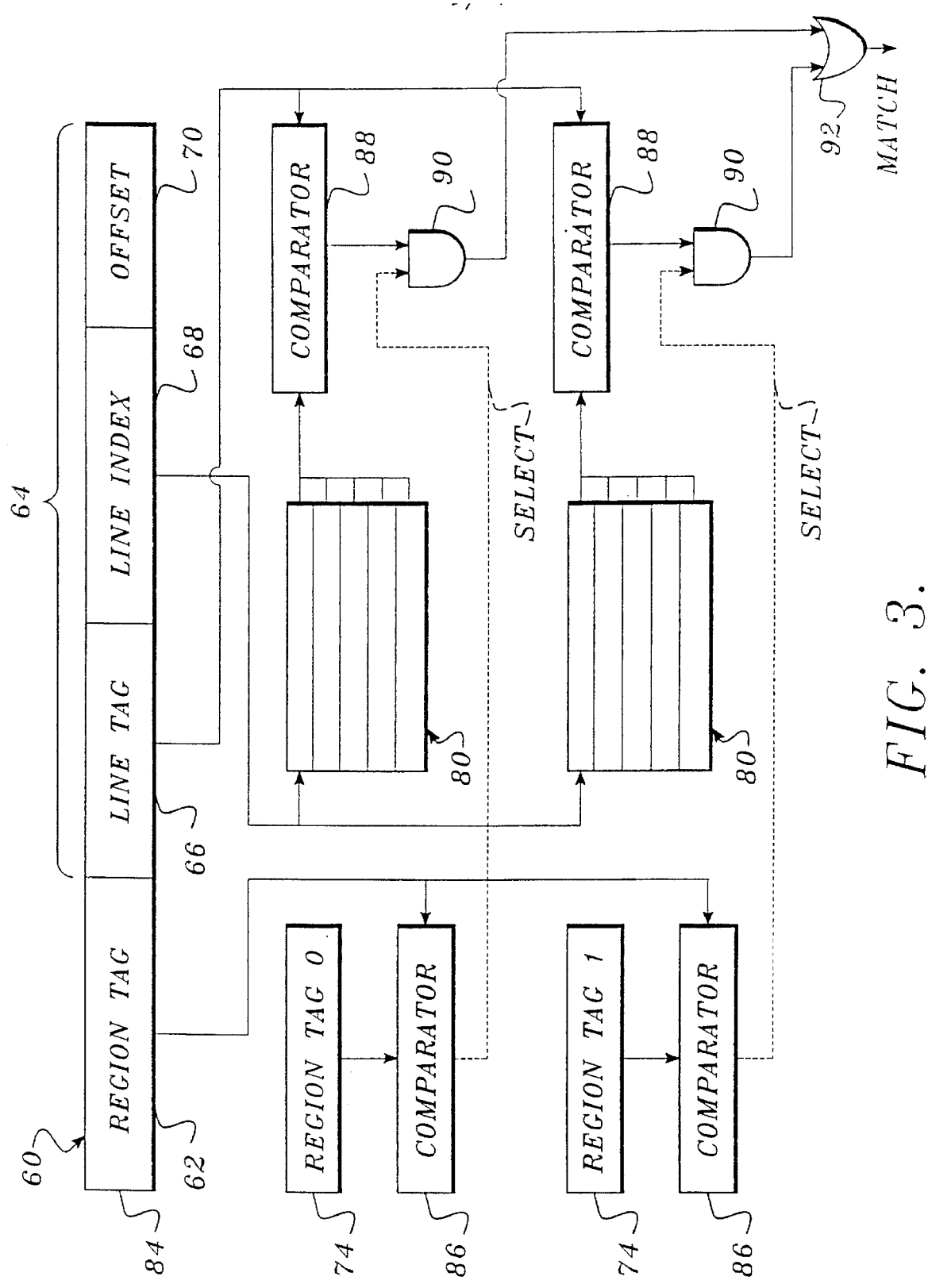
FIG. 3 is a schematic diagram of a data cache in accordance with the present invention.
Figure 4:
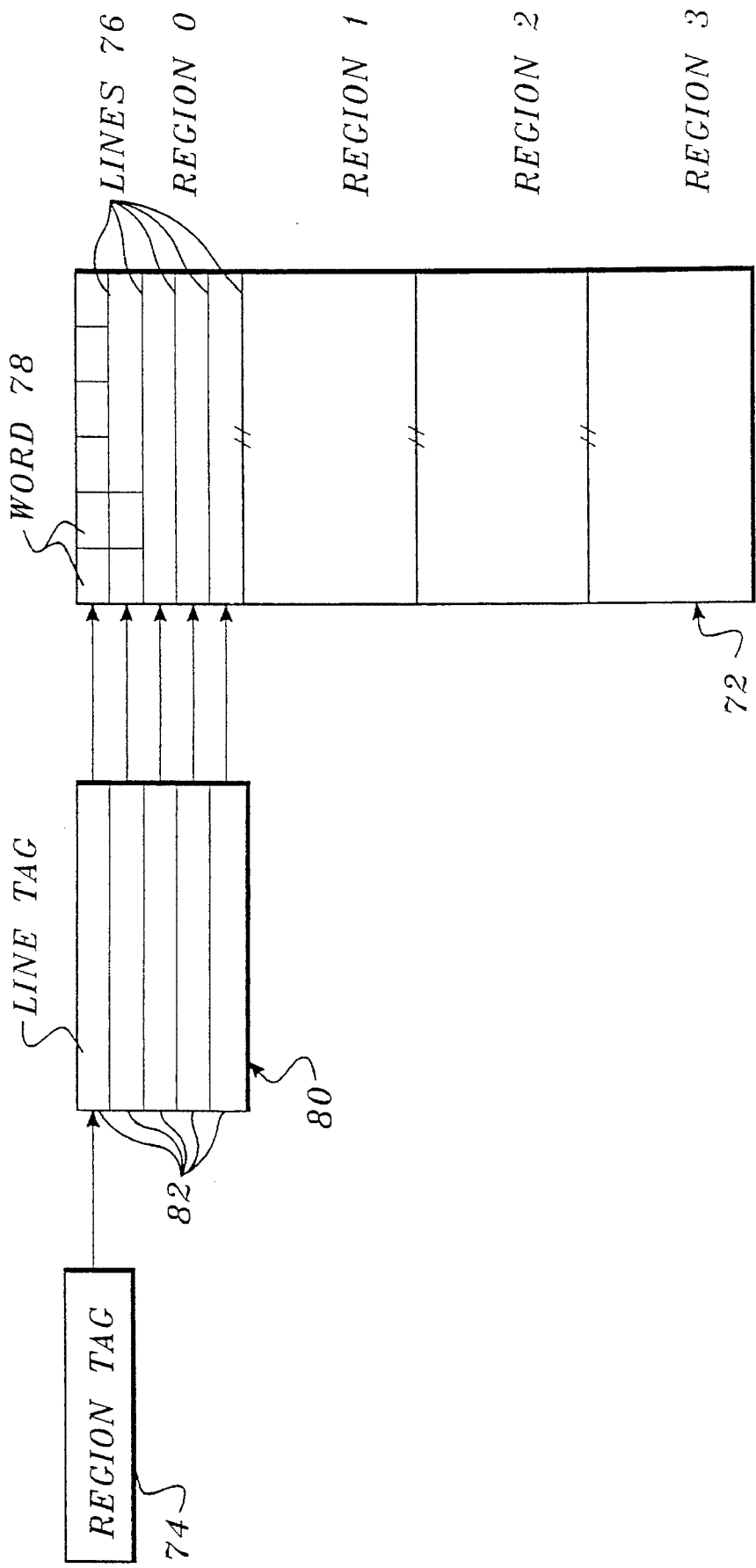
FIG. 4 is a schematic diagram of region registers, line registers and data storage configurations in accordance with a data caching scheme of the present invention.

With reference to FIG. 3, the caching scheme requires that each data memory address 60 be subdivided into a region tag 62 and a word tag 64. The word tags in turn includes a line tag 66, a line index 68, and an offset 70. With reference to FIG. 4, the data cache memory 72 is subdivided into regions. In the example, four Regions 0–3 are formed. Each region is associated with a register 74 containing a region tag. Each region within the data cache is further subdivided into a set of lines 76, each line comprising one or more words 78. Each line is associated with a line register 80, and a set of line registers 82 is associated with each region tag. The line register also contains an associated valid bit (not shown), which is set if the information contained in the line register and data storage are valid. The line and data registers are arranged in the form of an ordered array, to facilitate referencing a particular line tag within the array. For ease of illustration, only one set of lines, line registers and tag registers are shown for Region 0.

With reference again to FIG. 3, the address cache hardware includes an address register 84, a set of region registers 74 connected to region tag comparators 86, and a set of line registers 80, which are connected to line tag comparators 88. The outputs from the region tag comparators are used to select one of the line register sets using AND gates 90. The output from the line tag comparators corresponding to the selected line register set is used to produce a match indication via OR gate 92. Again, only two sets of components are shown out of the four sets associated with Regions 0–3.

During operation of the circuit, an address region tag is compared to the content of each of the region registers. If a match occurs, the output select line from the associated region comparator is high. The line index from the address is used to enable a particular line register in each of the sets of registers, regardless of whether a region tag match occurred. The line tag is then compared to the content of the enabled line register by the line comparators. The combined output from a set of region and line comparators at the AND gates produces a high signal if both region and line tags are matched. All of the AND gate outputs are combined at the OR gate. The OR gate output is high if any of the sets of comparators matched, i.e., if the requested data is currently in the data cache.

Figure 5:
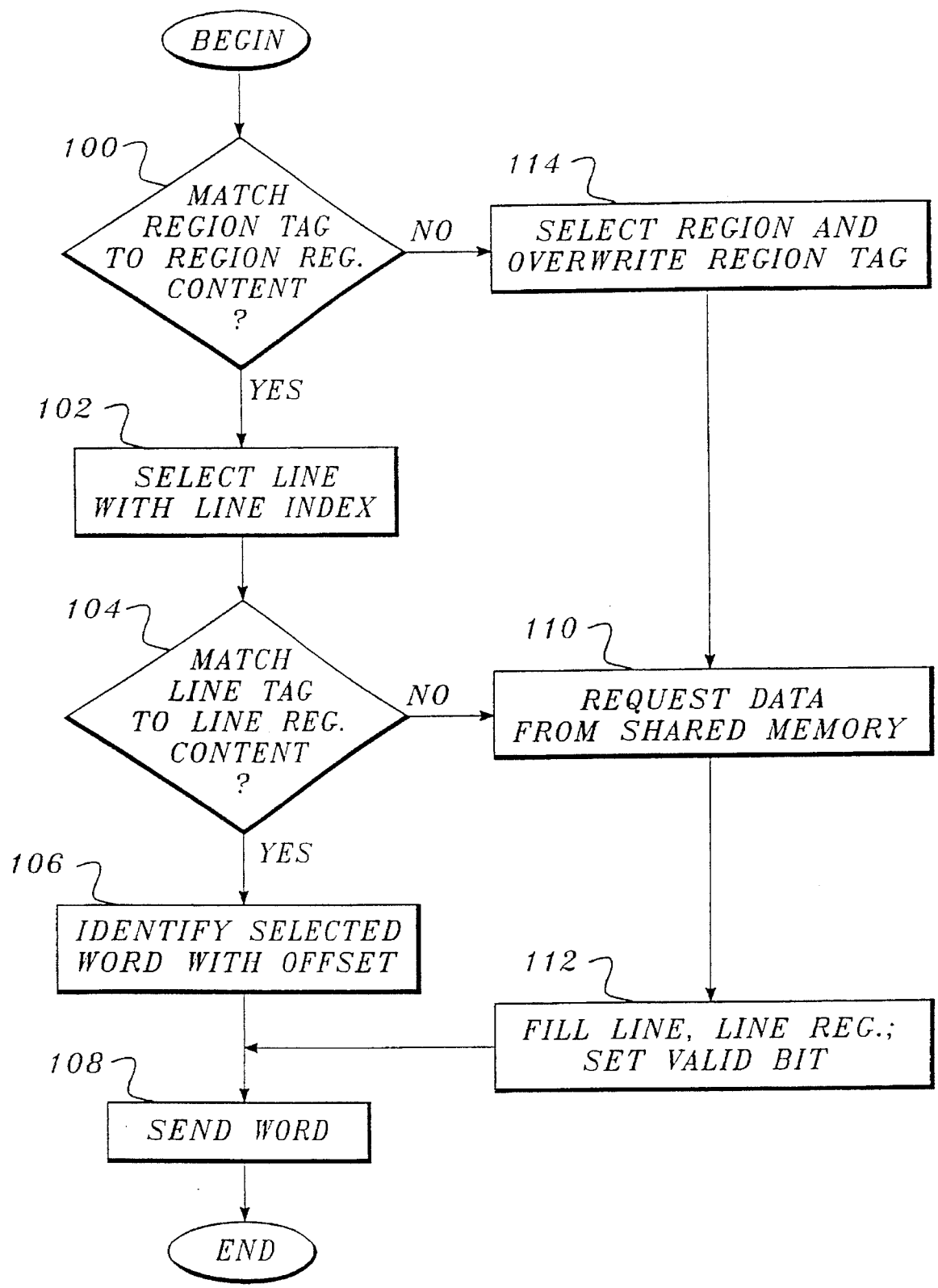
FIG. 5 is a flow diagram of a method for accessing data from memory storing using a data cache scheme in accordance with the present invention.

With reference to a block 100 in the flow chart of FIG. 5, when a memory address corresponding to a data request by the control ASIC 52 is received by the data cache 56, the region in which the address is located is first identified using a fully associative addressing mechanism that is based on the region tag within the data address. This method requires that the region tag from the address be compared to the content of each of the region registers 74. If the region tag matches the contents of one of the registers, then data from the particular region is available in the cache. This condition is true if one of the select lines from the region comparators is high, indicating a match.

Utilizing the line tag, line index and offset of the word tag, a direct-mapped scheme is used to identify the particular memory space associated with the identified region. At a block 102, the line index is used to select one of the entries in each line register. Because only one of the regions is selected at the AND gate 90 based on the output from the region comparators, only one set of line registers will be referenced in this discussion. At a block 104, the content of the line register at the line index is compared with the line tag of the memory address. If there is a match, at a block 106, a cache hit is deemed to have occurred, signifying that the requested data may be found within the cache. The corresponding valid bit is then set. Since a data register may hold a number of words of data, the offset is used to select a word from the line associated with the selected line register. At a block 108, the word found at the offset is read out to the control ASIC.

At block 104, if the line tag does not match the content of the selected line register, or if the valid bit is not set (implying that the data is invalid) a cache miss has occurred. The cache then passes on the memory address request to the shared memory at a block 110. When the data are returned to the cache, at a block 112 the data are loaded into the data register corresponding to the line index, e.g., the line is filled. A portion of the memory address is written as the line tag at the appropriate line register and the valid bit is set. At block 108, the requested data are sent to the control ASIC. Because there was no match at block 104, it is necessary to overwrite data that are already in the cache. Because a direct-mapped method is used, there is no choice as to which data are overwritten, and the management described in conjunction with blocks 110–112 is performed by a control state machine, which is permanently programmed for that purpose. The control state machine implementation is relatively fast.

If the region tag is not matched at block 100, then a region of data in the cache must be replaced by a section of data associated with the requested address. Because a fully associative addressing scheme is used for the region identification, there is some choice as to which region in the data cache will be overwritten. The conventional means of performing this choice in hardware is complex and expensive. Thus, the management of the cache regions is performed by software executed by the control ASIC. Generally, at a block 114, the region tag that has been least recently accessed is overwritten. The least recently accessed region is identified by maintaining a count of the region accesses as they occur. This method of monitoring component use is well known in the art. The decision to overwrite the least recently used region effects the desirable management scheme of overwriting a region that is least likely to be used in the future. The control ASIC 52 selects a region to be overwritten and loads the region tag for the fetched address into the appropriate region tag register. After the region to be overwritten has been chosen, an address request is sent to the shared memory at block 110, which returns the data to the control ASIC. The data is loaded into the data register as dictated by the line index of the address, and the line tag from the address is stored in the line register associated with the line index at block 112.

The distinguishing feature of a direct-mapped cache is that the data corresponding to any one memory address are permitted to reside in only one data register. Only a single line tag is compared with the initial address to detect a cache hit. In comparison, a fully associative cache allows any region to contain the data corresponding to a given memory address, and the entire array of region registers must be searched in order to detect a hit. Thus, a direct-mapped method may require many less comparisons than a fully associative method. As noted above, a direct-mapped cache can be maintained in a fairly straightforward manner by a control state machine, while the fully associative cache can be controlled by more flexible software. Because the swapping of regions is more costly in terms of processing time than the swapping of lines but occurs much less frequently, this combination of controls ensures that the region management is productive in spite of the overhead incurred by the software management scheme. Additionally, by combining the two methods, the straightforward line register updates can be done quickly in hardware. Thus, the data cache is operated to reduce shared memory fetches and thereby reduce vector processing interruptions.

In general, image processing involves large arrays of data and hence lends itself well to vector processing. For efficient vector operations, the vector processing units 20 contain vector data addressing hardware, which allows the vector register files 50 to be accessed with different addressing patterns. Each of the three vector register files 50 includes its own vector addressing hardware. Examples of regular addressing patterns or sequences are those required for convolutions and transformations. These addressing sequences usually consist of short subpatterns that are iterated to form the complete pattern. The subpatterns may themselves consist of similarly iterated subpatterns. The vector data addressing hardware permits most imaging algorithms utilizing regular addressing sequences to be performed in a single vector operation while avoiding software overhead in computing data addresses. The vector address generator of the present invention is a combination of hardware and software controls that reduces the cost of generating address sequences while providing flexible and efficient means for producing relatively complex sequences of addresses.

Figure 6:
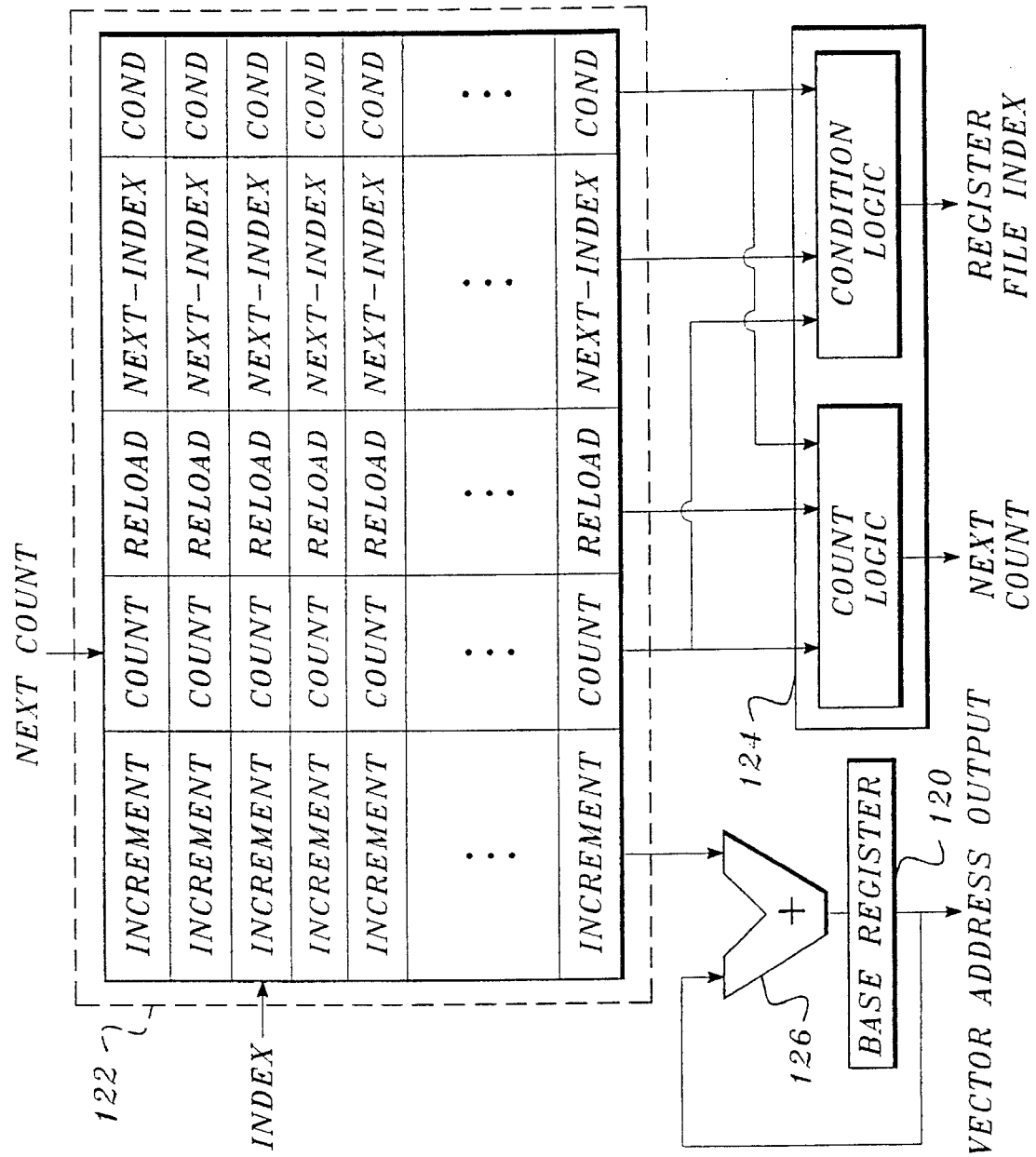
FIG. 6 is a schematic diagram of a vector address generator in accordance with the present invention.

With reference to FIG. 6, an address generator in accordance with the present invention includes a base address register 120, an increment table 122, a controller 124, and an adder 126. During initialization, the base address register is loaded with a base address from which the sequence begins. Additionally, the increment table is loaded with the necessary increment, repetition, and condition information from which the desired sequence can be generated. The information in the increment table represents the basic pattern of the desired sequence. The basic pattern is repeated as many times as necessary to produce the desired address sequence.

The base address register 120 is of sufficient size to store a vector address. In one actual embodiment, the increment table 122 is a 32-bit register file. The number of entries that are required varies according to the complexity of the sequence that must be generated. Typically, sixteen entries are sufficient for most common applications. Each entry includes fields for storing: increment, count, reload, next-index, and condition values. The increment field holds an integer value such as +1, −4, etc. The reload field value generally indicates the number of times the increment is repeated within a particular subpattern contained in the address sequence. The count value is used as a temporary value for tracking the number of times an increment has been repeated within a subpattern. This tracking is performed by initially copying the reload value into the count field of the same increment table entry, and then decrementing the count value each time the increment value for the increment table entry is output during a particular subpattern generation. When the count value has reached zero, it is automatically reloaded from the reload field. The decrementing and reloading are controlled by the count logic. In this manner, the reload value is not destroyed by using it as a count value.

The next-index value and the condition value are used by the controller to determine the next subpattern in the increment table to use after a particular subpattern has been completed.

During address sequence generation, the controller 124 repeatedly selects a current increment table entry, the increment value of which is output to the adder. The adder adds the increment to the address in the base register to produce a vector address output value. This value is output to the vector register and is also used to update the base register. The controller's condition logic then selects the next table entry based on the current entry's condition information and the next-index value. In this manner, a flexible, i.e., programmable, yet efficient address sequence generator is provided.

The set of values for the increment table are preestablished for a given address sequence by determining the basic pattern that makes up the complete addressing sequence, and the subpatterns within the basic pattern. For example, a convolution imaging operation requires the following general sequence of pixel values to be extracted from an image for processing:

1, 2, 3, 8, 9, 10, 16, 17, 18, . . .

The sequence basic pattern can be described as a subpattern formed by beginning from a zero base, incrementing the current base by one, and repeating the incrementing step three times. The next subpattern is described by the steps of incrementing the current base value by five. The entire pattern is repeated as many times as necessary to obtain the desired sequence. The increment table for this address sequence will therefore contain two increment values: +1 and +5. The reload value associated with the first table entry is three, and the reload value associated with the second table entry is one. Prior to storing this pattern information in the increment table, a method for determining flow between the subpatterns must also be established.

Although quite simple in this example, information defining the sequence in which the table entries are selected must also be loaded into the table. This step is necessary since it is not always true that the subpatterns appear in the increment table in the order in which they will be used by the address generator. The branching directions are preferably based on an index value stored in the next-index field. As an alternative, a conditional modification of the current table entry index by a constant integer value is used to generate the next-index value output by the condition logic. Each transition between subpatterns is analyzed to determine the next-index. In the present example, the pattern requires that the first and second subpatterns be sequentially repeated some number of times.

In one preferred embodiment, the current index is initialized to zero. After the first subpattern is completed, the current table index is incremented by one to advance to the second subpattern. When the second subpattern is completed, the current table index is reset to zero, indicating table index zero, and the pattern is repeated. Thus, the condition associated with the first subpattern is: when the count value is not equal to zero, use the current index; if the count value is equal to zero, go to the next-index value, which is 1 in the example. (The same branching can be achieved by updating the current table index to the current table index plus one, i.e., zero plus one.) Once the second subpattern has been completed, the current index must be set back to zero to repeat the first subpattern. Thus, the second condition is, if the count equals zero, use the next-index, which is set to zero. Each of these conditions is represented by a condition code, which is tested by the condition logic.

A set of three different condition values, ranging from zero to two inclusive, represents all regular subpattern transitions. A condition value of zero signifies that the controller is to continue referencing the current table entry until the count reaches zero; when the count reaches zero, the entry specified in the next-index field is used as the current index. A condition value of one signifies that the controller is to reference the current table entry once; having done so, it jumps to the next consecutive table entry, if the count is zero, and to the entry specified in the next-index field, if the count is non-zero. A condition value of two specifies that the controller is to reference the entry specified in the next-index field, if the count is zero, and otherwise should jump to the next consecutive table entry. By selecting the appropriate condition codes, complex branching patterns are formed. In the example, the condition code loaded for the first and second subpatterns is zero and the next-entry values are one and zero, respectively.

Other vector addressing schemes can be supported by altering the values in the increment table; most imaging operations, including the Fast Fourier Transform (FFT), can be supported. In the case of the FFT, the last stage of the FFT produces the results in bit-reversed order. The third vector register file 50, which stores the computation result from the FPUs, provides bit-reversed hardware in the vector address generator to unscramble the result data.

Figure 7:
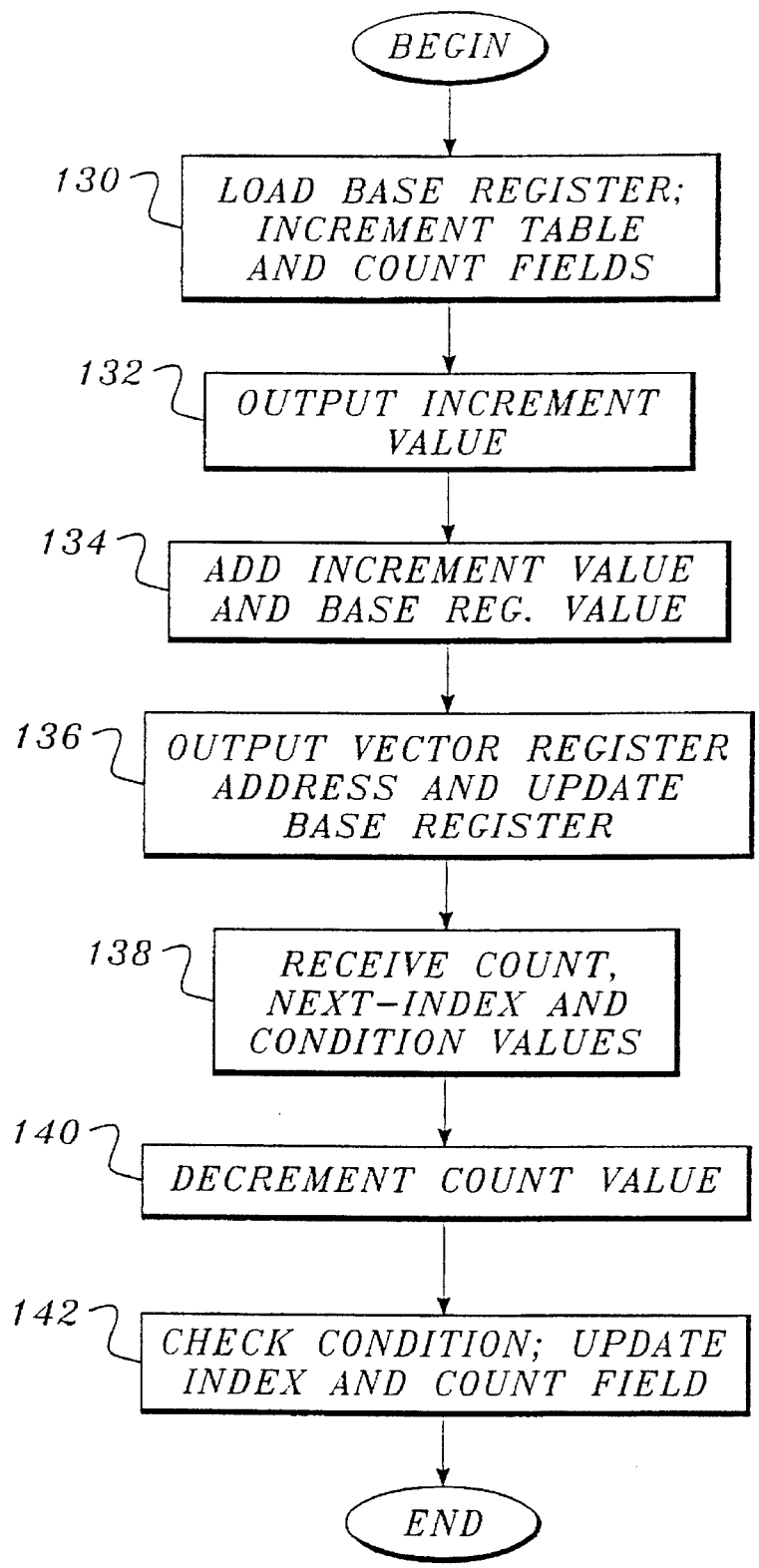
FIG. 7 is a flow diagram of a method for generating data address sequences in accordance with the present invention.

With reference to FIG. 7, to initiate address generation, at a block 130, a base address is loaded into the base register, the increment table is loaded with the preestablished address sequence variables, and the reload values are copied into the corresponding count fields. This last step allows for some simplification of the control logic.

The controller generally begins address generation at current table index zero. It is to be understood that address generation could be started at any row in the table by providing a value for the current index to the controller. At a block 132, the increment value from the current table entry is output to the adder, which combines the values from the increment table and the base register at a block 134. At a block 136, the resultant value is output as a vector register address and also is stored as the new value in the base register.

With reference to the controller, at a block 138, the count value, next-index value and condition value from the current table entry are received by the controller. In the convolution example, the initial count value equals three, the next-index value equals one, and the condition equals zero. At a block 140, the count value is decremented in each logic unit by one, to produce a value of two. At a block 142, the count value of two is then analyzed using the zero condition. The first condition states that if the count value does not equal zero, then the current index is unchanged. According to the condition, the new count value is stored in the current index's count field and the loop repeats beginning at block 132. The procedure is repeated until the count value reaches zero. Once the count value is zero, at block 142, according to the condition logic, the current index's count field is updated by the reload value (as it has reached zero), and the current index is updated with the next-index value, which is one. The loop then repeats for the second subpattern, located at table entry one, beginning at block 132. Generally, the address generator is operating under the control of the control ASIC 52, which dictates how many loops are performed, i.e., how many addresses are generated in the sequence. Alternatively, to terminate the process, the controller 124 may be provided with an initial value that indicates how many times the pattern should be completed in order to complete the particular process.

Using the present address generator, complex address generation patterns associated with different computations and algorithms can be analyzed to preestablish the increment table values and conditions for each pattern. These values and conditions are then used by the imaging system together with a base address to determine the sequence in which data residing in the vector registers are accessed. Thus, efficient generation of regular, and sometime, complex address sequences is provided.

With respect to the overall operation of the parallel vector processing unit 12, to efficiently utilize the sixteen processors 20, a simple interprocessor synchronization scheme and fast data access are primary requirements. The shared memory access logic 22 provides the interprocessor synchronization for the parallel vector processing unit. With reference again to FIG. 2, each vector processor 20 has two lines 59, termed token-in and token-out. In order to link the vector processors in serial fashion, a token-out line from one processor is essentially the token-in line for the next processor; the last processor's token-out line is connected to the first processor's token-in line, forming a ring. Tokens, either an access token or a null token, are passed between the vector processors over the token-in and -out lines 59. The token-in and -out lines are connected within each vector processor to a token register (not shown) that holds at least one bit. In one actual embodiment, the access token is a binary 1 value; the null tokens are binary 0. The access logic simply prevents a vector processor from accessing protected areas of shared memory unless that vector processor has control of the access token.

Figure 8:
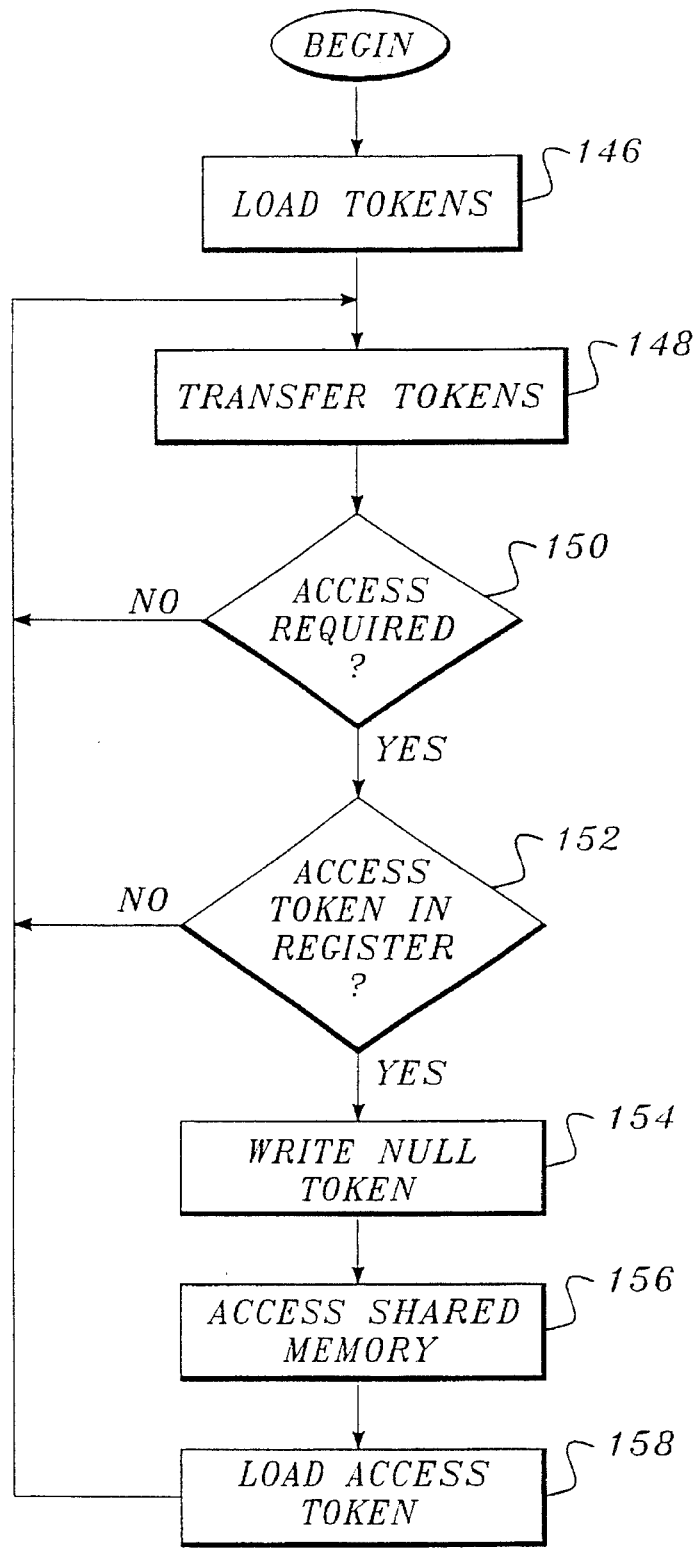
FIG. 8 is a is a flow diagram of a method for accessing shared memory using a token logic scheme in accordance with the present invention.

During operation initialization, an access token is generated and loaded into a token register by a single vector processor that has been assigned that particular task. All other vector processors generate and load null tokens. With reference to FIG. 8, the control logic executed by the control ASIC 52 for a single vector processor 20 is described. It is to be understood that each of the vector processor's control ASICs executes the same logic. At a block 146, the token registers are loaded. At a block 148, the tokens are transferred in synchronous fashion between the vector processors. The transfer timing is controlled by an external clock signal that is received by the control ASICs.

At a decision block 150, a check is made to determine whether the vector processor requires access to some shared variable in the shared memory. If so, at a decision block 152 the vector processor must wait until it receives the access token at its token register. If the access token is not in the token register, the process continues at block 148.

Once the access token is received, at a block 154, the vector processor removes the access token by writing a null token to its token register. The vector processor then accesses the shared variable without conflict from other processors at a block 156; during shared memory access, only null tokens are passed between the vector processors, preventing any other vector processor from accessing the shared memory. Once the access to the shared memory is completed, at a block 158, the accessing vector processor loads an access token in its token register. In this manner, the access token again enters the interprocessor token passing scheme. The process of passing tokens then continues at block 148.

This interprocessor memory access scheme benefits from the fact that it is a decentralized scheme that does not require any central overseer to control the memory accesses. Thus, although no central arbiter exists to determine priority of access, each vector processor gains fair access to the shared memory over time. Each vector processor must simply know which portions of shared memory are protected by the access logic, and must return an access token to its token register when shared memory access is complete. The integrity of the shared memory is thus maintained in a relatively simple manner, and at very low cost in terms of hardware or software requirements.

Shared Memory and Interconnection Network

In a parallel computer utilizing central shared memory, the sustained performance of the overall system is usually limited by the interconnection network and the bandwidth of the shared memory. In the present system, the shared memory and interconnection network architectures minimize data access conflicts. To increase memory bandwidth and to match the relatively slow memory to the processor speed (the processor cycle time is generally four to ten times faster than the memory cycle time), a memory interleaving scheme is used. In the present system, 32-way memory interleaving is used to achieve a 1,280 Mbytes/sec memory bandwidth.

Figure 9:
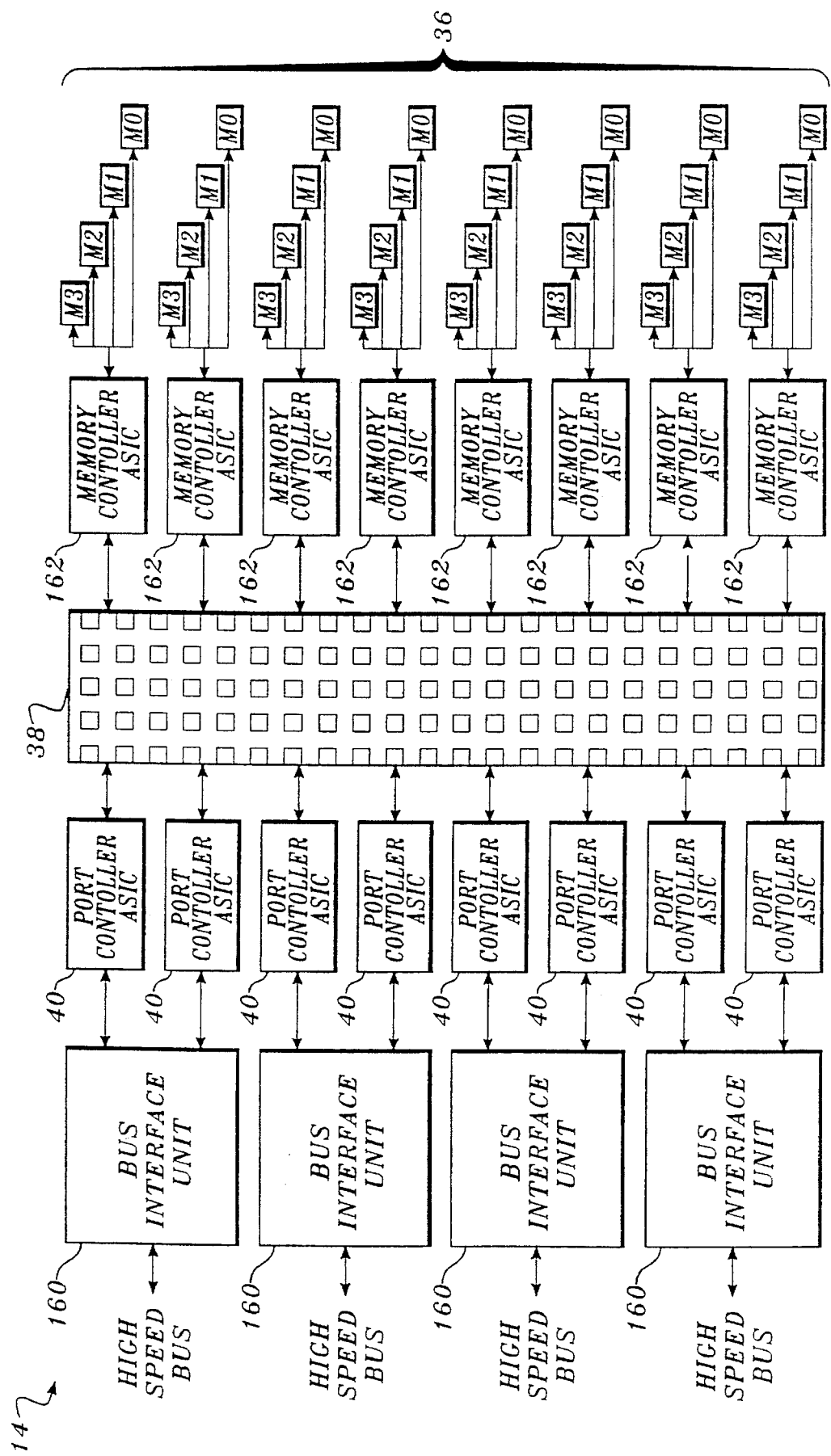
FIG. 9 is a schematic diagram of a shared memory in accordance with the present invention.

With reference to FIG. 9, the shared memory 14 consists of four bus interface units (BIUs)160, eight port controllers 40, an 8×8×40-bit crossbar network 38, eight memory controllers 162, and eight four-way interleaved memory modules 36.

The bus interface units 160 interface the high speed buses 16 to the port controllers 40; each bus interface unit interfaces one bus to two port controllers. All shared memory components operate with a 40 MHz clock cycle. Two port controllers communicate with one high-speed bus in an alternating fashion without conflict, using opposite halves of each clock cycle. The bus interface units interface the TTL-level logic in the shared memory to the BTL-level bus.

In one preferred embodiment, the port controllers 40 use 18,000 gate, CMOS gate-array ASICs. The port controllers translate memory address commands from the vector processing units 20 into simple commands which can be executed by the memory controllers 162 and control the crosspoint switches in conjunction with the memory controllers. The interconnection network is organized as an 8×8×40-bit crossbar network 38 using sixty-four crosspoint switches. In one actual embodiment, the crossbar network is implemented with discrete advanced Schottky TTL transceiver chips. Since the depth of the crossbar network is four bytes for data, plus additional lines for control signals (a total of 40-bits), and the cycle time of the network is 40 MHz, the total data transfer rate of the crossbar network is 1,280 Mbytes/sec. This crossbar network provides suitable bandwidth and data availability relative to the other system components. The crossbar network 38 provides a separate path between any port controller 40 and any memory controller 162 at all times, so that eight port controllers can communicate with eight MCs simultaneously.

The memory controllers 162 generate a physical address for each data word from an address command received from a port controller 40, and each comprises an 18,000 gate, CMOS gate-array ASIC. Each memory controller controls four interleaved DRAM memory modules 36, and accesses vector data from the memory modules at an access rate of 160 Mbytes/sec. In order to accommodate multiple memory chips of different capacities, the memory controller ASIC can operate with 1 Mbit, 4 Mbit, or 16 Mbit DRAMs.

The four memory modules 36 connected to each memory controller 162 provide a 25 nsec access time in the case of row vector data, which can utilize the four-way interleaving and page-mode access capability of the DRAM modules. Memory depth is 32-bits. Since the shared memory has eight memory controllers, each of which controls four interleaved memory modules, a total of 32 interleaved memory modules are supported, which provides a maximum memory space of 1 Gbyte (256 Mwords).

Since imaging and graphics processing are performed on two-dimensional blocks of information that describe a particular image, it is necessary to adopt a scheme for efficient access to two-dimensional blocks of data in the shared memory. In the present invention, a shared memory address generator reduces the amount of information that must be passed to the shared memory in order to access a block or partial block of data. Generally, the vector processors can access a scalar data item, a column or row vector, or 2-dimensional array data in the memory modules 36 with a single command, provided any data region requests are generally sequential in order. The address generator is incorporated into the parallel vector processing unit, the graphics subsystem, and the shared memory via the various control units.

In conventional memory addressing schemes, a block of data is requested by presenting the memory controller with an array or sequence of address commands, including a value for a base address and a value for the offset(s) from the base. Such addressing is generally done in one dimension, e.g., memory addresses begin at the memory's origin, and sequential addresses are assigned for each value along the rows. Each row wraps around to the next row. For example, in a memory space that is 100×100, originating at 0, an array A is stored beginning at space 62; a request for the third value in array A might be (62,3), or simply (65), which is the absolute address. If the addressing is performed in two dimensions, the request would be (62,0,3,0), indicating that the base is at (62,0) and the offset within that space is (3,0), e.g., three spaces in the x-direction from the base and zero spaces in the y-direction. Generally, a whole series of requests are made for data that are sequentially ordered in memory, since that is how image data are stored. Thus, a request for two rows of data, three values wide might be (62,3), (62,4), (62,5), (162,3), (162,4), (162,5). Alternatively, the absolute location of each data word may be specified, e.g., (65), (66), ..., (166), (167). Thus, twelve or six addresses are required to obtain six pixels.

To take advantage of the sequential relationship of these access requests, the vector processor control ASIC 52 of the present invention forms a reduced size address request. According to the present invention, the example above would result in an address request [65:3][65:2] which represents [absolute base:width][absolute base:height]. This reduced set is received at the address generator of the port controller 60. The address request is first broken down into a series of one-dimensional requests, such as [65:3],[165:3]. Each of these sequences is transmitted through the crossbar network to the appropriate memory controller 162. An address generator within the memory controller breaks down the one-dimensional request into a series of zero-dimensional requests, such as (65), (66), (67), and (165), (166), (167). Each of these individual requests is sent to a memory module 36 which returns the pixel value stored at the particular memory location. Thus, the request for six pixels is accomplished with as little as four pieces of address information carried by the high speed buses. The bandwidth savings is even greater when larger blocks of data are requested.

A similar address generating scheme is implemented by the graphics subsystem. In one application of the shared memory address generator, a bit block transfer unit (bit-blit) with zoom capability utilizes the address generator to obtain a source image in a fast and efficient manner. Block transfer hardware is generally used to transfer pixel information from a source position in memory to a destination position in the same or another memory. Bit-blit units utilize several addressing and counter registers to identify the position of the source and destination images. The source registers include an x-value and a y-value, specifying the location at which the image is oriented, and the width (x-length) and height (y-length) of the source image. The destination registers include the x- and y-orientation coordinates, and width and height values of the desired destination image. In the present invention, the bit-blit destination registers also include x- and y-zoom factors.

To reduce the hardware requirements in the bit-blit unit of the present invention, the source registers described above are eliminated and the shared memory address generating scheme is utilized. In this manner, the starting address or base, the width, and height of the source image are generated by the graphics subsystem and processed by the shared memory control ASICs. The stream of pixels generated by the shared memory access are processed by the destination logic of the graphic subsystem's bit-blit unit. The logic controls the storing of one line of pixels in a buffer until the entire line, i.e., a number of pixels equal to the width value, is received. The line is then replicated into the video memory in accordance with the x- and y-zoom factors. For example, if zoom factor x equals 2, each pixel, beginning with the pixel at the first (x,y) orientation is read into two sequential memory spaces in the destination image. This doubles the length of the destination image. Similarly, if the zoom factor y is 2, the line of pixels stored in the buffer will be read out into the destination image at two sequential line positions, which doubles the height of the destination image. The overall integration of the shared memory address generator and the destination module of the bit-blit unit provides an efficient bit-blit unit having zoom capabilities without requiring software control.

Graphics Subsystem

The graphics subsystem 18 is the primary agent for maintaining and drawing an image, and also for generating realistically-shaded three-dimensional images from scene descriptions. In one actual embodiment, the graphics subsystem 18 comprises a parallel-pipelined architecture capable of providing a graphics performance of about 200,000 Gouraud shaded polygons/sec. The display component supports 24-bit full color images, and double frame buffers are incorporated to support smooth animation. The host interface provides a 20 Mbytes/sec data transfer rate between the imaging and graphics processing system 10 and a connected host computer.

Figure 10:
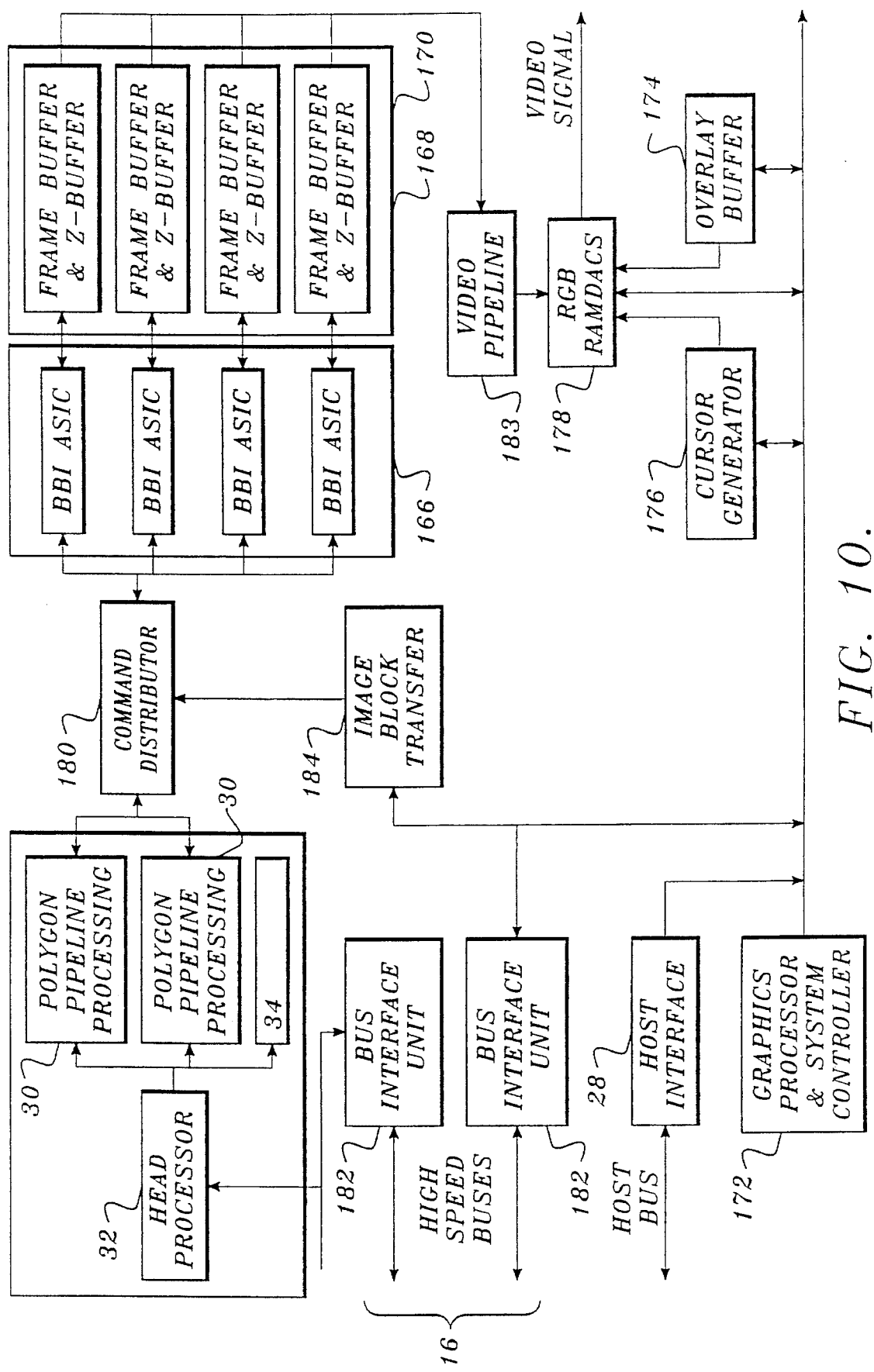
FIG. 10 is a block diagram of a graphics subsystem in accordance with the present invention.

With reference to FIG. 10, the graphics engine 24 consists of two independent polygon processing pipelines 30, four bit-blit interpolator (BBI) ASICs 166, a Z-buffer 168, and a double-buffered frame buffer 170, a TMS34020-based graphics processor and system controller 172 (available from Texas Instruments), an overlay buffer 174, a cursor generator 176, RGB RAMDACs 178, a host interface 28, a command distributor 180, two bus interface units 182, a video pipeline 183, and an image block transfer unit 184.

The system controller 172 maintains the host interface, acts as a central controller for the overall system, and controls the overlay buffer 174. In one actual embodiment, a 4 Mbyte local memory (not shown) is provided for storing programs and data associated with the system controller.

All communications between the imaging and graphics processing system 10 and a host computer (not shown) are performed through the host interface 28 in the graphics subsystem.

The graphics subsystem utilizes the two high speed buses 16 to store and load data to and from the shared memory 14. One of the high speed buses is used to load graphics data from the shared memory 14 to the polygon processing pipelines 10. The other bus is used to transfer the image data, program and any control information between the shared memory 14 and the host interface 28 and the graphics processor 172.

Figure 11:
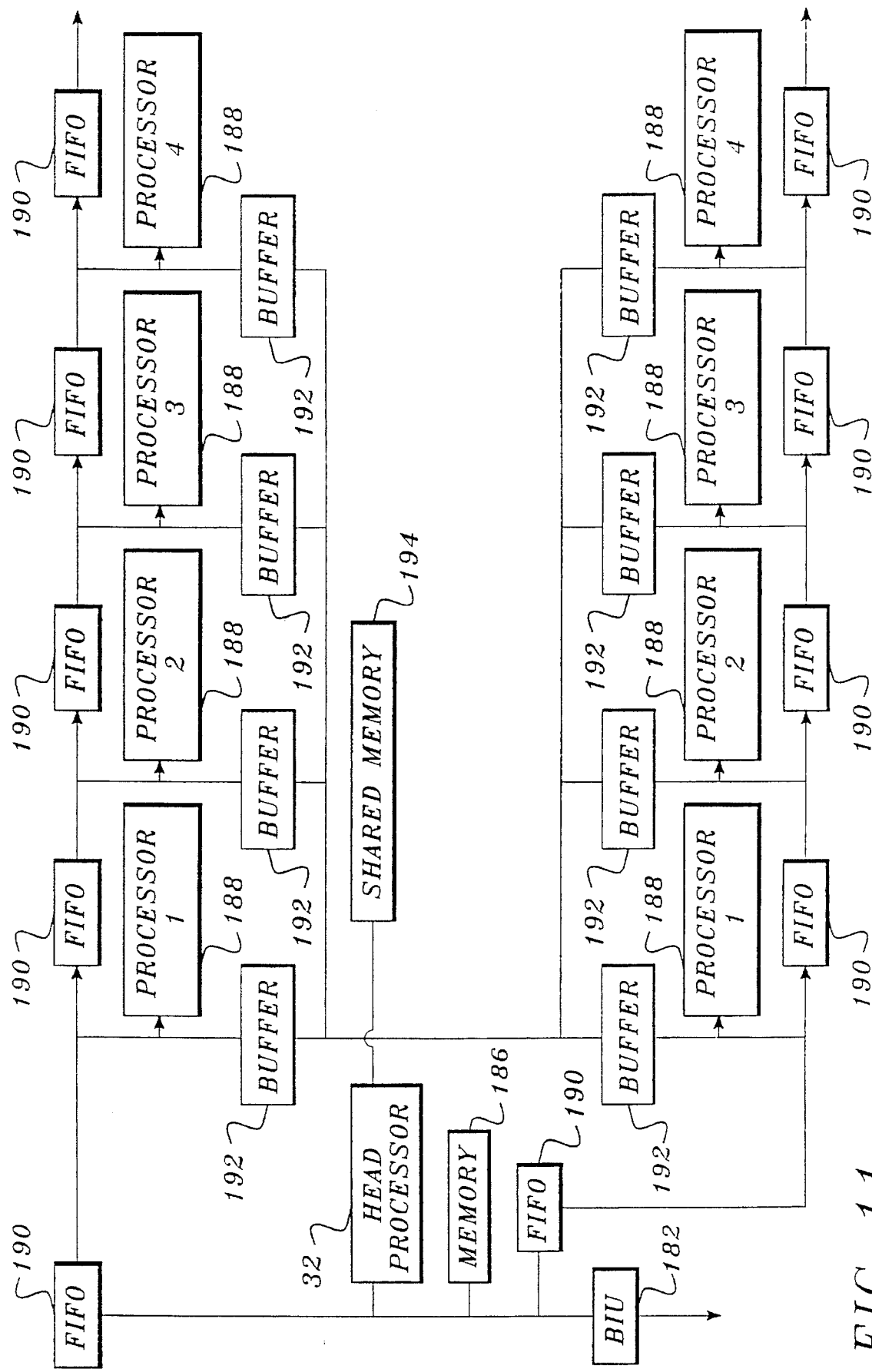
FIG. 11 is a block diagram of a graphics engine in the graphics subsystem of FIG. 10.

With reference to FIG. 11, the head processor 32, which is located at the front end of the processing pipelines 30, is responsible for the communication between the graphics engine 24 and the shared memory 14. In one actual embodiment, the head processor predicts the total amount of processing power, or load, required for rendering the given scene and divides it such that all pipeline stages have equivalent loads thereby increasing overall processing efficiency. The head processor uses an 8K×64 SRAM 186 as its local memory to store its instruction code and data as well as the structural information of the object hierarchy whose physical data are stored in the shared memory. The head processor is followed by two pipelines, each containing a multiplicity of pipelined stages. The head processor distributes the polygons extracted from the hierarchy to the first stages of the two pipelines according to the processors' requests. Since the two pipelines comprise identical hardware and firmware, the system can be readily redesigned for higher or lower performance of the graphics engine by increasing or decreasing the number of pipelines, or by altering the number of processor contained within each pipeline.

The two polygon processing pipelines 30 carry out front-end processing for three-dimensional computer image synthesis. The operations provided by the pipelines include geometric transformation, back-face culling, illumination, clipping, projection and slope calculation. In one embodiment, the polygon processing pipelines comprises of nine i80860 CPUs, available from Intel Corporation, of Santa Clara, Calif., operating in a parallel-pipelined configuration. The head processor 32, communicates directly with the shared memory through a bus interface unit 182 to extract the actual polygons by traversing an object hierarchy, and distributes polygon processing jobs to the two pipelines. Each pipeline has four polygon processors 188 (corresponding to four pipeline stages). The head processor 32 dynamically assigns polygon rendering jobs to each pipeline stage in such a way as to balance the load between the eight polygon processors of the two pipelines. The computational results of these pipelines are fed to the four BBI ASICs 166 (FIG. 10) which perform scan conversion in conjunction with hidden surface removal.

The four pipeline stages each include a polygon processor 188, a first-in-first-out (FIFO) buffer 190, and a data buffer 192. In one embodiment, each pipeline stage is assigned to carry out one of the four graphics processing tasks, including transformation, lighting, clipping, and rendering of polygon vertices. Because graphics processing is done sequentially so that each of the four tasks is performed for every polygon in the same order, it is natural to sequentially connect the processors. Thus, polygon processor 1 performs transformation and passes the results to polygon processor 2, which performs the lighting calculations, etc. In order to accommodate the passing of information, the processors are connected using the first-in-first-out (FIFO) buffers 190. Each polygon processor reads the data from the FIFO of the previous stage, processes the data, and writes the results to its FIFO. By using this particular data result passing scheme, the polygon processors avoid the need for time-consuming memory accesses to retrieve data for processing. Thus, graphics processing speeds are increased.

In order to perform the processing steps, each polygon processor requires memory in which to store programs and program variable data. In many applications, each CPU is provided with its own individual local memory. The drawbacks of using individual local memory include the inefficiency of providing enough local memory to accommodate the maximum amount of space that may be required by a process, when in fact the maximum amount of memory may rarely be required, and the replication of common or shared instructions and data in the local memory of the processors. The present invention replaces the individual local memory concept with a small, local shared memory 194 (distinct from the large main shared memory available to the entire system), accessible only by each of the polygon processors. The various graphic software routines needed to perform the four primitive graphics processing functions are stored in the local shared memory 194. Additionally, each of the polygon processors can utilize the shared memory space to store temporary values during processing. Because all of the graphics routines are commonly accessible from the local shared memory 194, each polygon processor may be dynamically assigned different tasks or subtasks rather than being permanently dedicated to a particular task or subtask. Also, by maintaining the FIFO linkage between the polygon processors, the overall graphics processing is speeded up, since each polygon processor does not have to write to and read from local shared memory in order to obtain polygon information from its predecessor. By reducing the number of read and write operations to the local shared memory, graphics processing speed is increased.

As noted, an advantage is gained by utilizing the local shared memory and by exploiting the sequential ordering of the graphics processing tasks to dynamically assign the tasks to each pipeline stage in a load balanced manner. At a high level, each polygon is rendered after the four basic graphics tasks are completed. Each task can be broken down into a series of subtasks, each of which is performed sequentially in a known fixed order. The processing cycle requirements for some tasks are dependent on the number of vertices of the polygon and/or the number of the simulated light sources in the scene. In any given case, the head processor can calculate the number of processing cycles required for each task from the numbers of the vertices and the light sources and assign the cycles to each pipeline stage uniformly. For each polygon, the head processor evaluates the total number of the processing cycles and the load boundaries between pipeline stages to balance the processing requirements. This load balancing is very dynamic because the number of vertices varies from polygon to polygon and the number of light sources varies from scene to scene. It is thus desirable to analyze, and possibly alter, the processes being performed by each polygon processor for each polygon.

Figures 12A, 12B:
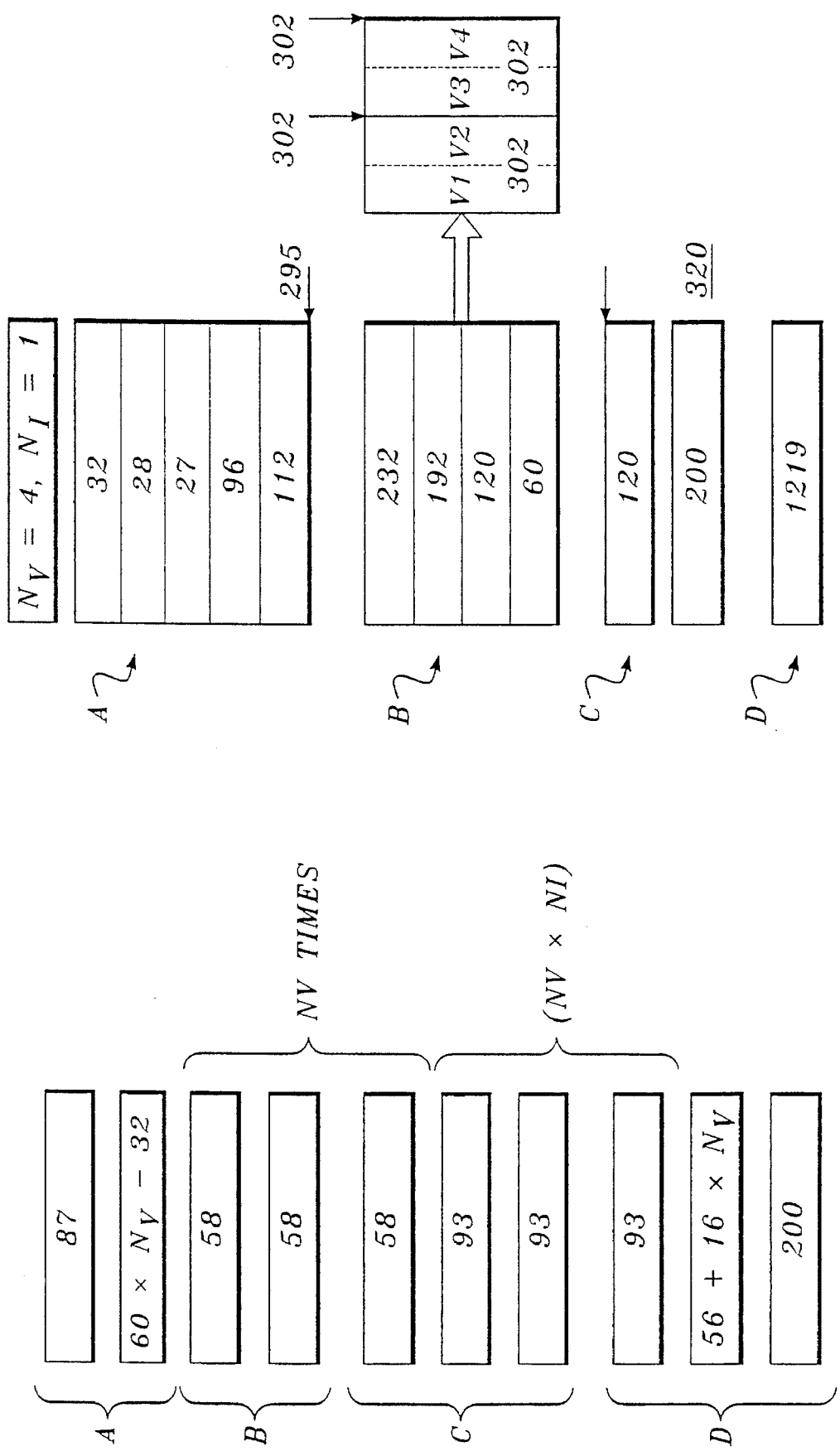
FIG. 12A is a table of polygon processing cycle requirements for polygon processors used in one preferred embodiment of the invention.
FIG. 12B is a table of polygon processing cycle requirements for an example polygon.

With reference to FIG. 12A, the four main graphics tasks are shown in blocks A–D, with each task broken into subtasks. The numeric labels in the subtask blocks are the approximate number of processing cycles required to carry out the particular subtask. Such an approximation is determined for the processing pipelines for the specific type of polygon processors used. Task processing cycle requirements are shown for the Intel i80860 processors. In the subtask blocks, $N_v$ is the number of vertices and NI is the number of simulated light sources. The total number of processing cycles is given by Cycles=$311+ 134(N_v)+93(N_v)$(NI). The value of Cycles is calculated from the number of vertices and the number of simulated light sources when data for a polygon is received from shared memory 14. The number of Cycles is then divided by four to produce a shared cost value, Cost, that should be borne by each polygon processor.

The iterative process for identifying load boundaries is initiated by the head processor, which updates a table containing the cost per subtask according to the number of vertices and the number of simulated light sources for the next polygon to be processed. Beginning with the first processor 1, the processor's cycles are set to zero. While the number of cycles assigned to processor 1 is less than Cost, the processor's cycles are increased by the cost of the next sequential subtask. Once processor 1's cycles are greater than Cost, a check is made to determine whether processor 1's total cycles should be reduced to better approximate Cost. A reduction equal to the cost of the last subtask is done if: (Cost minus the processor's cycles minus the last subtask cost) is less than (the processor's total cycles minus the last subtask cost). In this manner, the processor cycles are assigned as close as possible to the optimum value of Cost. The assignment of costs continues with the next processor and the next subtask cost that has not been assigned. In this manner, the load boundaries are identified for the particular polygon to be processed and the subtask assignments related to the calculated load boundaries are sent out by the head processor to the appropriate polygon processors. In turn, each of the polygon processors obtains the control information for its subtasks from the local shared memory 194 and processes the polygon information accordingly.

An example of the load balancing process, is shown in FIG. 12B. The cycle numbers appearing as labels in blocks A–D correspond to a polygon wherein the number of vertices $N_v=4$ and the number of light sources NI=1. Under these conditions, the first task requires 295 cycles, the second task 604 cycles, the third task 120 cycles, and the fourth task 200 cycles. The Cost is approximately 305 cycles. In order to balance the load, the second task is split approximately between two processors so that each processor performs approximately 302 processing cycles. The third and fourth tasks are then combined for a total of 320 cycles. Thus, the load balance across the pipeline stages is 295, 302, 302, and 320 cycles which represents an approximate balance between the processors in each pipeline stage.

A similar load balancing process can be utilized for any set of sequential tasks that can be broken up into subtasks, and whose task processing costs depend on identifiable variables. Utilizing the shared memory and FIFO-linking configuration, as well as the load balancing algorithm, the present graphics processor access and processes ,graphics data in an efficient manner.

With respect to the display device, the BBI ASICs 166 carry out image drawing to the frame buffer 168 using the span data computed by the polygon processing pipelines. The span data is passed from the pipeline processors to the BBI ASICs by the command distributor 180. In one actual embodiment, the four BBI ASICs are capable of drawing and filling image pixels at the rate of 40 million pixels per second. The BBI ASICs also control the memory in the frame buffer 168 and Z-buffer 170, and carry out screen refresh functions. The combination of the polygon processing pipelines and four BBI ASICs is capable of delivering over 200,000 100-pixel polygons per second with Gouraud shading.

Figure 13:
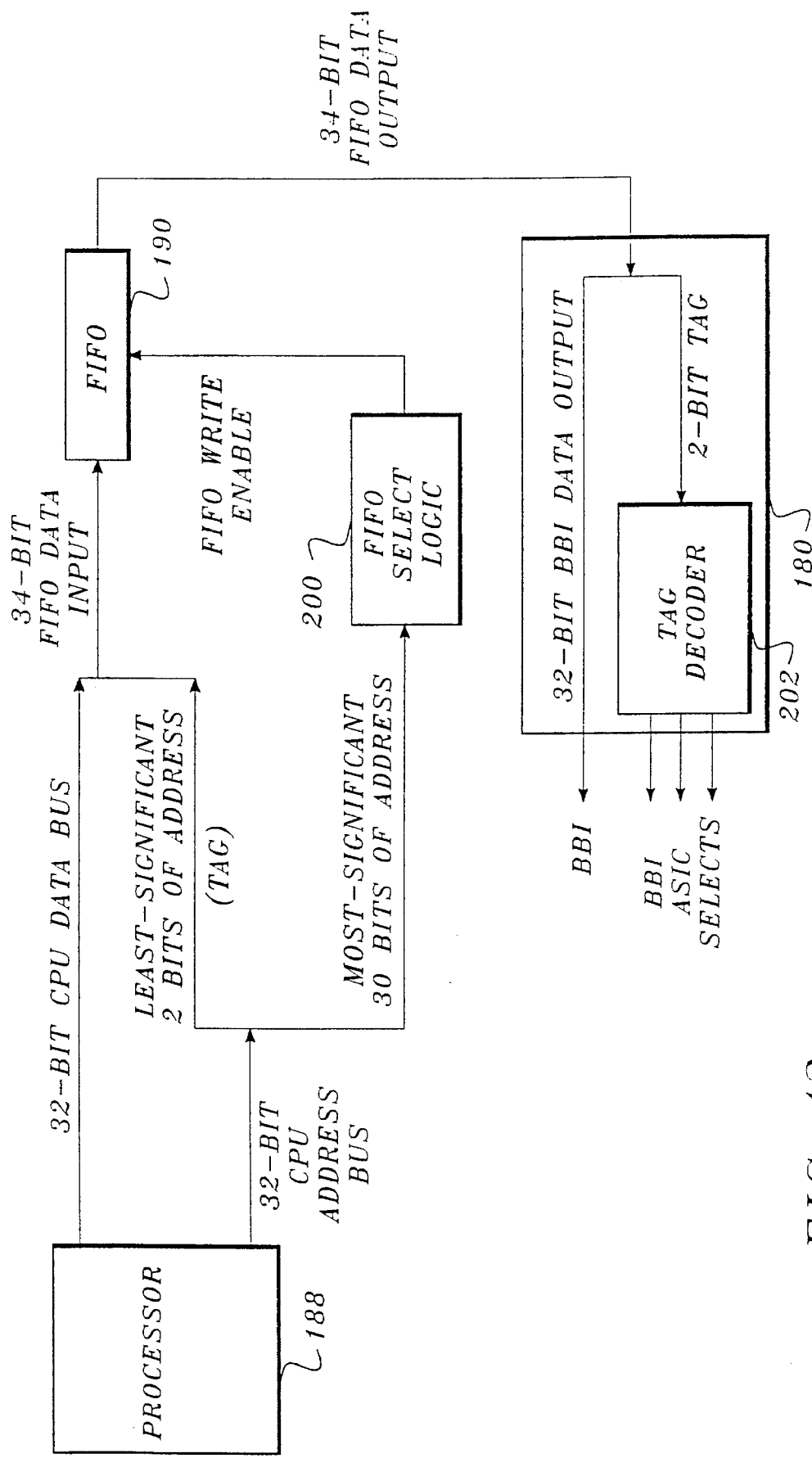
FIG. 13 is a block diagram of an address tagging mechanism in accordance with the present invention.

Because multiple BBI ASICs are utilized to provide fast drawing capability, the command distributor 180 must identify the particular BBI ASIC 166 to which each piece of graphic data is destined. Rather than adding an identifying bit or bits to the data, thus increasing the bandwidth of the data that is passed from the polygon processing pipelines to the BBI ASICs, an addressing scheme within the last stage's polygon processor's address memory is used. Generally, the scheme requires that the polygon processor memory address includes logical information identifying the specific BBI ASIC to which the information is destined. With reference to FIG. 13, an address tagging protocol of the present invention uses FIFO select logic 200, FIFO buffer 190, and a tag decoder 202. The first two components are part of the polygon pipeline; the third component is part of the command distributor 180.

Figure 14:
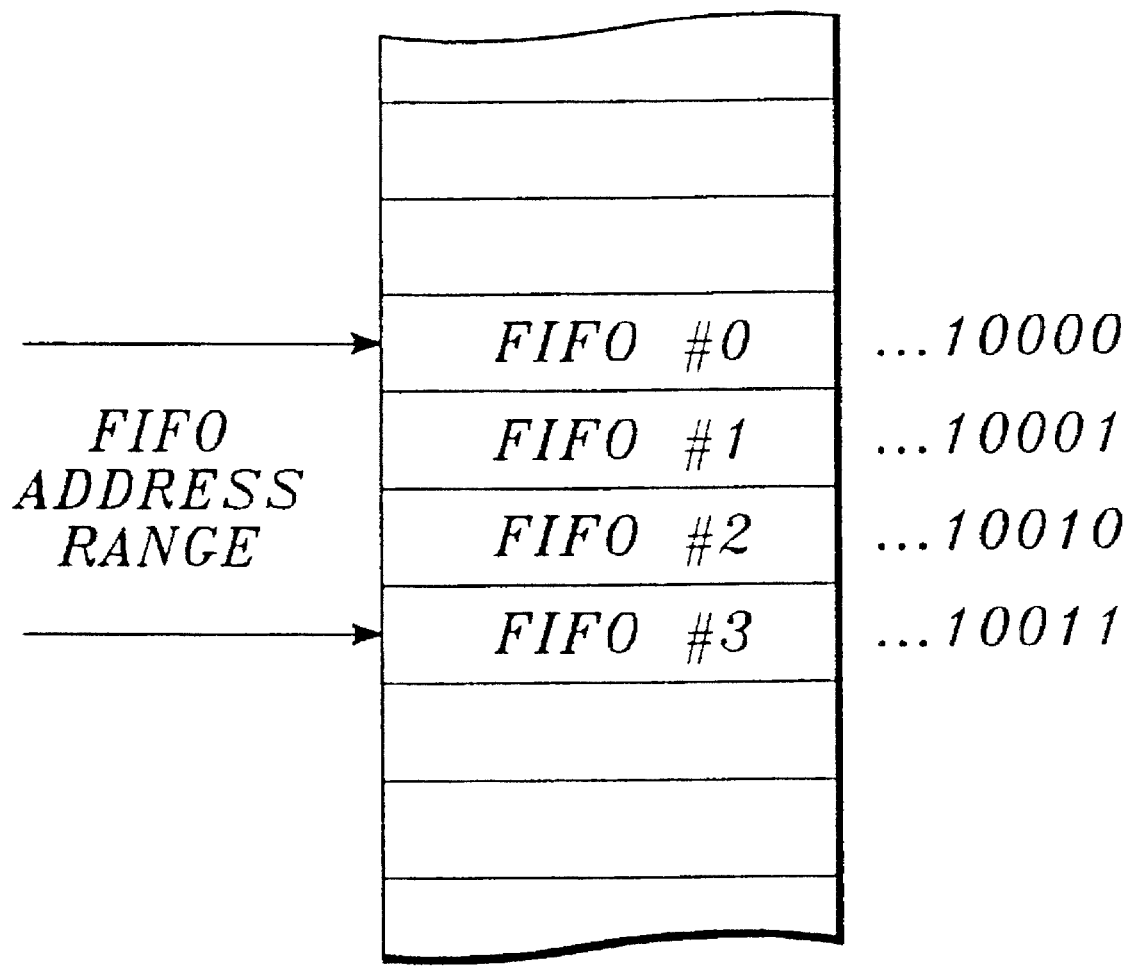
FIG. 14 is a schematic diagram of memory space used in the address tagging mechanism of FIG. 13.

With reference to FIG. 14, a FIFO address range within the address space of a polygon processor is partitioned into four sectors; each sector is associated with a particular BBI ASIC. The polygon processor appears to be writing to four different FIFOs, each of which represents one BBI ASIC. The addresses are partitioned such that the least significant two bits of each address identifies the particular FIFO 0–3. In the example, addresses . . . 10000, . . . 10001, . . . 10010, and . . . 10011 are the FIFO memory locations associated with each FIFO 0–3, respectively. The processor address lines that carry the two least significant bits, or tag, are connected to the FIFO 190, which accepts the two bits as data along with the 32-bit graphic data, forming a total of 34-bits of tagged data.

In order to select the FIFO, the uppermost address bits, all of which are identical, are input to the FIFO select logic 200 to generate an enable signal on the FIFO write enable line. The select logic compares the uppermost 30-bits of the polygon processor address output to a prestored number representative of the upper 30-bits of the FIFO address range. If a match occurs, the FIFO select line goes high, and the FIFO is enabled. This action causes the 34-bits of tagged data to be received from the polygon processor, and the 34-bits in the FIFO to be output to the command distributor 180. The command distributor peels off the tag bits and routes them to the tag decoder. Similarly, the 32-bits of graphic data are output to the BBI ASICs. The tag decoder identifies the destination BBI ASIC from the tag and enables the proper BBI ASIC to receive the data using the BBI ASIC select lines. By utilizing the polygon processor's address lines essentially as device identification lines, it is possible to identify the destination BBI ASIC without increasing the data bandwidth between the polygon processor and the FIFO. The invention can be utilized to tag data in any system that includes memory space that is assigned to a set of destination devices and that can be partitioned so that each address space partition has a logical meaning. A reference to any of the partitions will then implicitly cause the referenced data to be tagged with the tag assigned to the particular destination device.

As discussed above, the graphics subsystem, through the image block transfer 184, utilizes the abbreviated image addressing scheme to obtain source data during bit block transfers. The remainder of the graphics subsystem can be implemented with relatively well known display processors and host interfaces.

While preferred embodiments of the invention have been illustrated and described, it will be appreciated that various changes can be made therein without departing from the spirit and scope of the invention.

The embodiments of the invention in which an exclusive property or privilege is claimed are defined as follows:

1. A method of generating a device identification for data to be transmitted between a processor having an addressable memory space and one of a plurality of destination devices, the method comprising:

partitioning the addressable memory space into a plurality of sectors by assigning a uniquely identifiable tag portion of the addresses in the addressable memory space to each sector, wherein each tag portion identifies one of the destination devices;

receiving, at the processor, a data address at which the data to be transmitted are stored in the addressable memory space;

using the processor to extract a tag portion from said data address and concatenate the tag portion to the data to be transmitted to form tagged data;

transmitting the tagged data from the processor to a device identifier;

using the device identifier to extract the tag portion from the tagged data, identify a destination device from the tag portion, extract the data to be transmitted from the tagged data and forward the data to be transmitted to the identified destination device.

2. A method of generating a destination device for use in transferring bytes of graphics data from a processor for generating the bytes of graphics data to a plurality of destination devices for additional processing of the bytes of graphics data such that the processor is shared by the destination devices and selectively provides bytes of graphics data to each, such processor having a multibit data output and a separate multibit address output, which method comprises:

transmitting the bytes of graphics data from the shared processor data output on a databus having a bandwidth corresponding to the bandwidth of the processor data output;

concatenating a first portion of the shared processor address output with a byte of the shared processor data output to form a data packet comprised of the shared processor data output and such first portion of the shared processor address output, such first portion of the shared processor address output constituting a tag for identifying the particular destination device for receiving the graphics data;

storing the complete data packet including the byte of graphics data and the tag in a buffer;

triggering the buffer to output the data packet on a second databus having a bandwidth corresponding to the bandwidth of the complete data packet;

supplying the tag of the data packet to a decoder for identifying the particular destination device to receive the graphics data, and using the decoder to trigger such particular destination device to receive the graphics data; and supplying the graphics data portion of the data packet to such particular destination device without the tag.

* * * * *

UNITED STATES PATENT AND TRADEMARK OFFICE
CERTIFICATE OF CORRECTION

PATENT NO. : 5,467,459
DATED : November 14, 1995
INVENTOR(S) : T. Alexander et al.

It is certified that error appears in the above-indentified patent and that said Letters Patent is hereby corrected as shown below:

| COLUMN | LINE | |
|--------|------|---|
| 1 | 4 | "continuation" should read --divisional-- |

Signed and Sealed this

Twenty-fifth Day of June, 1996

Attest:

BRUCE LEHMAN

*Attesting Officer*  *Commissioner of Patents and Trademarks*